US008321378B2

(12) United States Patent
Phillips et al.

(10) Patent No.: US 8,321,378 B2
(45) Date of Patent: *Nov. 27, 2012

(54) METHOD AND APPARATUS FOR MANAGING INFORMATION RELATED TO STORAGE ACTIVITIES OF DATA STORAGE SYSTEMS

(75) Inventors: Jeffrey Phillips, Northbridge, MA (US); David Allen, Holliston, MA (US); Brett Serkez, Framingham, MA (US); Peter Bouchard, Norton, MA (US)

(73) Assignee: EMC Corporation, Hopkinton, MA (US)

( * ) Notice: Subject to any disclaimer, the term of this patent is extended or adjusted under 35 U.S.C. 154(b) by 537 days.

This patent is subject to a terminal disclaimer.

(21) Appl. No.: 12/008,376

(22) Filed: Jan. 10, 2008

(65) Prior Publication Data
US 2008/0133624 A1    Jun. 5, 2008

Related U.S. Application Data

(63) Continuation of application No. 11/353,360, filed on Feb. 14, 2006, now Pat. No. 7,346,636, which is a continuation of application No. 09/471,869, filed on Dec. 23, 1999, now Pat. No. 7,054,892.

(51) Int. Cl.
*G06F 17/30* (2006.01)

(52) U.S. Cl. ......... 707/640; 707/652

(58) Field of Classification Search ......... 707/640, 707/644, 645, 648, 650–652, 654
See application file for complete search history.

(56) References Cited

U.S. PATENT DOCUMENTS

| 5,005,122 A | 4/1991 | Griffin et al. |
| 5,386,545 A | 1/1995 | Gombos et al. |
| 5,495,607 A * | 2/1996 | Pisello et al. ............... 707/797 |

(Continued)

FOREIGN PATENT DOCUMENTS

EP    0 822 498 A1    4/1998

OTHER PUBLICATIONS

International Search Report cited in PCT/US00/31735.

*Primary Examiner* — Cam-Linh Nguyen
(74) *Attorney, Agent, or Firm* — Dergosits & Noah LLP; Todd A. Noah

(57) ABSTRACT

Methods and apparatus for managing information related to backup storage activities of data storage systems. In a computer system having one or more independent backup data storage systems coupled to each other and each serving one or more clients, a user may obtain information related to backup activities of any of the backup storage systems from a single location. Through a user interface associated with any of the backup storage systems, or through a stand alone user interface, a user may manage (e.g., organize, display, print) information related to backup activities of any or all of the backup storage systems. System administrators can design and store a variety of report formats that may be utilized by any user to display or print various parameters associated with backup activities in a particular manner. Report formats may be edited by users, and displayed parameters may be dynamically updated to provide for active monitoring of one or more backup storage systems. Additionally, periodic backup activity reports can be generated and automatically sent to designated locations, for example to one or more printers and/or to one or more designated recipients via E-mail.

19 Claims, 14 Drawing Sheets

U.S. PATENT DOCUMENTS

| | | | |
|---|---|---|---|
| 5,586,249 A | 12/1996 | Suzuki et al. | |
| 5,613,106 A | 3/1997 | Thurman et al. | |
| 5,649,196 A | 7/1997 | Woodhill et al. | |
| 5,673,381 A | 9/1997 | Huai et al. | |
| 5,751,997 A * | 5/1998 | Kullick et al. | 711/162 |
| 5,799,323 A | 8/1998 | Mosher, Jr. et al. | |
| 5,852,713 A | 12/1998 | Shannon | |
| 5,968,121 A | 10/1999 | Logan et al. | |
| 6,003,044 A | 12/1999 | Pongracz et al. | |
| 6,026,414 A | 2/2000 | Anglin | |
| 6,076,148 A * | 6/2000 | Kedem | 711/162 |
| 6,148,415 A | 11/2000 | Kobayashi et al. | |
| 6,173,376 B1 | 1/2001 | Fowler et al. | |
| 6,202,135 B1 * | 3/2001 | Kedem et al. | 711/162 |
| 6,311,232 B1 * | 10/2001 | Cagle et al. | 710/8 |
| 6,353,878 B1 | 3/2002 | Dunham | |
| 6,363,462 B1 * | 3/2002 | Bergsten | 711/162 |
| 6,397,308 B1 | 5/2002 | Ofek et al. | |
| 6,438,707 B1 | 8/2002 | Ronstrom | |
| 6,457,053 B1 * | 9/2002 | Satagopan et al. | 709/226 |
| 6,505,215 B1 * | 1/2003 | Kruglikov et al. | 707/635 |
| 6,542,975 B1 * | 4/2003 | Evers et al. | 711/162 |
| 6,543,004 B1 * | 4/2003 | Cagle et al. | 714/15 |
| 6,564,215 B1 | 5/2003 | Hsiao et al. | |
| 6,564,235 B1 * | 5/2003 | Otsuka et al. | 1/1 |
| 6,584,477 B1 * | 6/2003 | Mosher, Jr. | 707/610 |
| 6,647,474 B2 | 11/2003 | Yanai et al. | |
| 6,751,674 B1 * | 6/2004 | Satagopan et al. | 709/249 |
| 2002/0156965 A1 | 10/2002 | Gusler et al. | |

* cited by examiner

(torpedo): Auto-Report – "Most Recent Backups"   402

Days
◇ Daily
  ☐ Include Weekends
◇ Weekly
  ☐ Sunday      ☐ Thursday
  ☐ Monday      ☐ Friday
  ☐ Tuesday     ☐ Saturday
  ☐ Wednesday
◇ Monthly by Day   [1st]  [Monday]
◇ Monthly by Date
  [1] [2] [3] [4] [5] [6] [7]
  [8] [9] [10] [11] [12] [13] [14]
  [15] [16] [17] [18] [19] [20] [21]
  [22] [23] [24] [25] [26] [27] [28]
  [29] [30] [31]

Time
Time: [7:00] 🕐

Send Results To:
☐ Printer: [           ]
☐ Email:   [root       ]
☐ File:    [monthly report]
☐ Add Timestamp to Filename Results Format
◇ Column
◇ Comma Separated Values (CSV)

[OK]   [Cancel]   [Help]

FIG. 14

METHOD AND APPARATUS FOR MANAGING INFORMATION RELATED TO STORAGE ACTIVITIES OF DATA STORAGE SYSTEMS

RELATED APPLICATIONS

This application is a Continuation of U.S. patent application bearing Ser. No. 11/353,360, filed on Feb. 14, 2006, which is a Continuation of U.S. patent application bearing Ser. No. 09/471,869, filed Dec. 23, 1999, now issued as U.S. Pat. No. 7,054,892. The entire contents of each of these applications is incorporated herein by reference.

BACKGROUND OF INVENTION

1. Field of Invention

The present invention relates to data storage for computers, and more particularly, to methods and apparatus for managing information related to storage activities of one or more data storage systems.

2. Discussion of Related Art

Virtually all computer applications rely on some form of data storage. The term "data" generally refers to any information, including formatting information, computer code (executable programs), and other information that may be manipulated and/or utilized by an executable program. Accordingly, data storage systems generally can be used, for example, for storing computer code, a variety of variables and other information, and particular arrangements and organizations of data, such as databases.

In a variety of computer environments, a "backup" data storage system may be desirable in addition to a "primary" data storage system. Generally, a backup data storage system provides redundant data storage and archiving to permit recovery of data in the event of, for example, corruption of the data in the primary storage system, failure of the primary storage system, and the like.

FIG. 1 illustrates one example of a conventional computer environment 200 including a computer system 10, a primary storage system 12, and a backup storage system 14. In FIG. 1, the computer system 10 is coupled to the backup storage system 14 via line 18. The line 18 may represent a direct connection dedicated exclusively to transmitting information between the computer system 10 and the backup storage system 14. Alternatively, the line 18 may represent a non-dedicated connection such as an open network connection (as indicated by the dashed arrows in FIG. 1) which can be used for other purposes. For example, when the line 18 is a network connection, it may also be connected to one or more other computer systems similar to the computer system 10, or other network devices (not shown). In a network environment, the computer system 10 may be configured as a conventional network computer system. Examples of such systems include a Sun Microsystems computer system (running the Solaris operating system, a version of UNIX™), a Hewlett-Packard (HP) computer system (running HP-UX, a Hewlett-Packard version of the UNIX™ operating system), an IBM computer system (running the AIX operating system, an IBM version of UNIX™), or any other computer system with an associated operating system suitable for network operation.

In FIG. 1, the primary storage system 12 may be any type of storage system including one or more storage devices employing a variety of storage media, such as magnetic or optical disks, magnetic tape, and the like. Additionally, the primary storage system may include a processor and one or more controllers to manage writing data to and reading data from the storage media. While the primary storage system 12 is directly connected to the computer system 10 in FIG. 1, the primary storage system 12 alternatively may be coupled to the computer system 10 via a network (e.g., via the line 18 serving as a network connection or via a different network). One example of a storage system suitable for use as the primary storage system 12 in FIG. 1 is the SYMMETRIX line of disk arrays, available from EMC Corporation, of Hopkinton, Mass.

The backup storage system 14 of FIG. 1 may include one or more backup storage devices (e.g., disk drives, tape storage, or any other storage media), together with a processor and one or more controllers for storing data on the storage media and recovering the data from the storage media. An example of a backup storage system suitable for use as the backup storage system 14 is the EMC® Data Manager (EDM), also available from EMC® Corporation, of Hopkinton, Mass.

The EDM backup system is a "turnkey" product designed to manage and store large amounts of backup data. In particular, the EDM backup system is capable of providing unattended offline or online backup of one or more network client computer systems. For example, in computer environments such as that shown in FIG. 1 in which the line 18 represents a network connection, an EDM backup system may act as a backup server to one or more client computer systems (such as the computer system 10) coupled to the network. The EDM backup system is a fully integrated package that includes all required hardware (e.g., a host processor, controllers, user interface components, etc.), and software for storage media management and backup system operation. In addition to UNIX™ environments, the EDM backup system fully supports, for example, OS/2™, NetWare™, Windows NT™ and other operating systems, and is capable of performing database backup and restore operations for vendors such as Oracle™, Sybase®, Informix™, and Microsoft SQL™.

As shown in the computer environment of FIG. 1, the backup storage system 14 optionally may be directly connected to the primary storage system 12 via a dedicated line 20 (e.g., an EDM backup system may be connected directly to a SYMMETRIX storage system via the dedicated line 20). For situations in which the line 18 represents a network connection, the dedicated line 20 connecting the backup storage system 14 to the primary storage system 12 may improve performance when backing-up and restoring large amounts of data (e.g., large databases) by avoiding the transfer of data over the network.

As also shown in FIG. 1, the backup storage system 14 typically is coupled to (or includes) a user interface 22. The user interface 22 may include, for example, a keyboard, keypad and/or mouse, a display which is capable of displaying text and/or graphics, and a printer. The user interface 22 may be integrated as part of the hardware and software package of the backup storage system 14. Alternatively, some or all of the components constituting the user interface may be discrete components coupled to the backup storage system 14.

Through the user interface 22, a user (e.g., system operator or administrator) may access information related to backup activities performed by the backup storage system 14. For example, via the user interface 22, a user may access (e.g., display or print) information indicating the success or failure of completed backup data storage operations performed by the backup storage system 14 on one or more computer systems 10 coupled thereto. Information related to the backup activities of the backup storage system 14 typically is maintained in a portion of the storage area of the backup storage system.

FIG. 2 is a diagram showing a computer environment 202 in which three independent backup storage systems 14A, 14B, and 14C are employed as servers to accommodate data backup and restoration operations for a number of respective clients 100-108. By employing multiple backup storage system servers to accommodate the data storage needs of a number of clients, large amounts of data may be backed up and/or restored in shorter time frames than are possible with one backup storage system server for the same number of clients, as the multiple servers 14A, 14B, and 14C can operate in parallel.

In FIG. 2, the backup storage systems 14A, 14B, and 14C each is coupled to (or includes) a respective user interface 22A, 22B, and 22C. Each of the backup storage systems of FIG. 2 is also coupled to a respective network 180A, 180B, and 180C that can be used to transport data between the backup storage system and its respective clients. Alternatively, while not shown in FIG. 2, the backup storage systems 14A, 14B, and 14C, as well as the clients 100-108, may all be coupled to the same network, with particular clients being serviced by particular backup storage systems. In FIG. 2, each client may be similar to, for example, either the computer system 10 or the primary storage system 12 shown in FIG. 1.

One drawback of the computer environment 202 shown in FIG. 2, and with conventional backup storage systems in general, is that from each user interface 22A, 22B, and 22C, a user may only access information related to the backup activities of the one of the backup storage systems (14A, 14B and 14C, respectively) associated therewith. For example, a user is unable to access information related to the backup activities of backup storage systems 14B and 14C from the user interface 22A, even if all of the backup storage systems are coupled to the same network.

SUMMARY OF INVENTION

One embodiment of the invention is directed to a computer system, comprising a plurality of backup storage systems including at least first and second backup storage systems to each backup information stored on at least one client. The computer system also includes at least one user interface, coupled to at least the first and second backup storage systems, to receive information related to backup activities of the first and second backup storage systems.

Another embodiment of the invention is directed to a method that is performed in a computer system including at least first and second backup storage systems to each backup information stored on at least one client, and at least one user interface coupled to the first and second backup storage systems. The method comprises an act of receiving, at the at least one user interface, information related to backup activities of the first and second backup storage systems.

Another embodiment of the invention is directed to a method that is performed in a computer system including at least one user interface and at least one backup storage system to store backup data from at least one client. The method comprises an act of receiving information related to backup activities of the at least one backup storage system at the at least one user interface over a path that is not dedicated to transporting information between the at least one backup storage system and the at least one user interface.

Another embodiment of the invention is directed to a user interface for use in a computer system having at least one backup storage system, wherein the at least one backup storage system stores backup data from at least one client. The user interface comprises at least one controller, to be coupled to the at least one backup storage system, to receive information related to backup activities of the at least one backup storage system over a path that is not dedicated to transporting information between the at least one backup storage system and the user interface.

Another embodiment of the invention is directed to a computer readable medium encoded with a program for execution on a computer system that includes at least one user interface and at least one backup storage system to store backup data from at least one client. The program, when executed on the computer system, performs a method comprising an act of receiving information related to backup activities of the at least one backup storage system at the at least one user interface over a path that is not dedicated to transporting information between the at least one backup storage system and the at least one user interface.

Another embodiment of the invention is directed to a method that is performed in a computer system having at least first and second backup storage systems to each store backup data from at least one client. The method comprises an act of receiving information related to backup activities of the second backup storage system at the first backup storage system.

Another embodiment of the invention is directed to a first backup storage system to store backup data from at least one first client, wherein the first backup storage system is for use in a computer system having a second backup storage system to store backup data from at least one second client. The first backup storage system comprises a first controller, coupled to the second backup storage system, to receive information related to backup activities of the second backup storage system.

Another embodiment of the invention is directed to a computer readable medium encoded with a program for execution on a computer system that includes first and second backup storage systems coupled together, wherein the first and second backup storage systems each store backup data from at least one client. The program, when executed on the computer system, performs a method comprising an act of transferring information related to backup activities of the second backup storage system between the second backup storage system and the first backup storage system.

Another embodiment of the invention is directed to a method performed in a computer system having at least one user interface and at least one backup storage system to store backup data from at least one client. The method comprises an act of transmitting information related to backup activities of the at least one backup storage system to the at least one user interface over a path that is not dedicated to transporting information between the at least one backup system and the at least one user interface.

Another embodiment of the invention is directed to a first backup storage system to store backup data from at least one client, wherein the first backup storage system is for use in a computer system having at least one user interface. The first backup storage system comprises at least one controller to transmit information related to backup activities of the first backup storage system to the at least one user interface over a path that is not dedicated to transporting information between the first backup storage system and the at least one user interface.

Another embodiment of the invention is directed to a computer readable medium encoded with a program for execution on a computer system that includes at least one user interface and at least one backup storage system to store data from at least one client. The program, when executed on the computer system, performs a method comprising an act of transmitting information related to backup activities of the at least one backup storage system to the at least one user interface over a path that is not dedicated to transporting information between the at least one backup system and the at least one user interface.

Another embodiment of the invention is directed to a method performed in a computer system having at least one backup storage system to store backup data from at least one client. The method comprises acts of determining an occurrence of an event at which a report of information related to backup activities of the at least one backup storage system is to be generated, and automatically generating the report when it is determined that the event has occurred.

Another embodiment of the invention is directed to a method of providing information related to backup activities of the at least one backup storage system, wherein the backup activities include the backing up of at least one work item associated with the at least one client, and wherein the method is performed in a computer system having at least one backup storage system to store backup data from at least one client. The method comprises an act of providing only status of a most recent backup of the at least one work item when the at least one work item is backed up more than once in a given time period by the at least one backup storage system.

BRIEF DESCRIPTION OF DRAWINGS

FIG. 10 is a graphical representation of another management window that can be provided by a user interface according to one embodiment of the invention, in connection with editing the format of backup activity reports generated according to the method of FIG. 5;

FIG. 11 is a graphical representation of yet another management window that can be provided by a user interface according to one embodiment of the invention, in connection with editing the format of backup activity reports generated according to the method of FIG. 5;

FIG. 12 is a graphical representation of a management window that can be provided by a user interface according to one embodiment of the invention, in connection with automatic/periodic backup activity report generation;

FIG. 13 is a graphical representation of another management window that can be provided by a user interface according to one embodiment of the invention, in connection with automatic/periodic backup activity report generation; and FIG. 14 is a graphical representation of a management window that can be provided by a user interface according to one embodiment of the invention, in connection with the selection of a backup activity report refresh rate used in a step of the method of FIG. 6.

DETAILED DESCRIPTION

Figure 1:
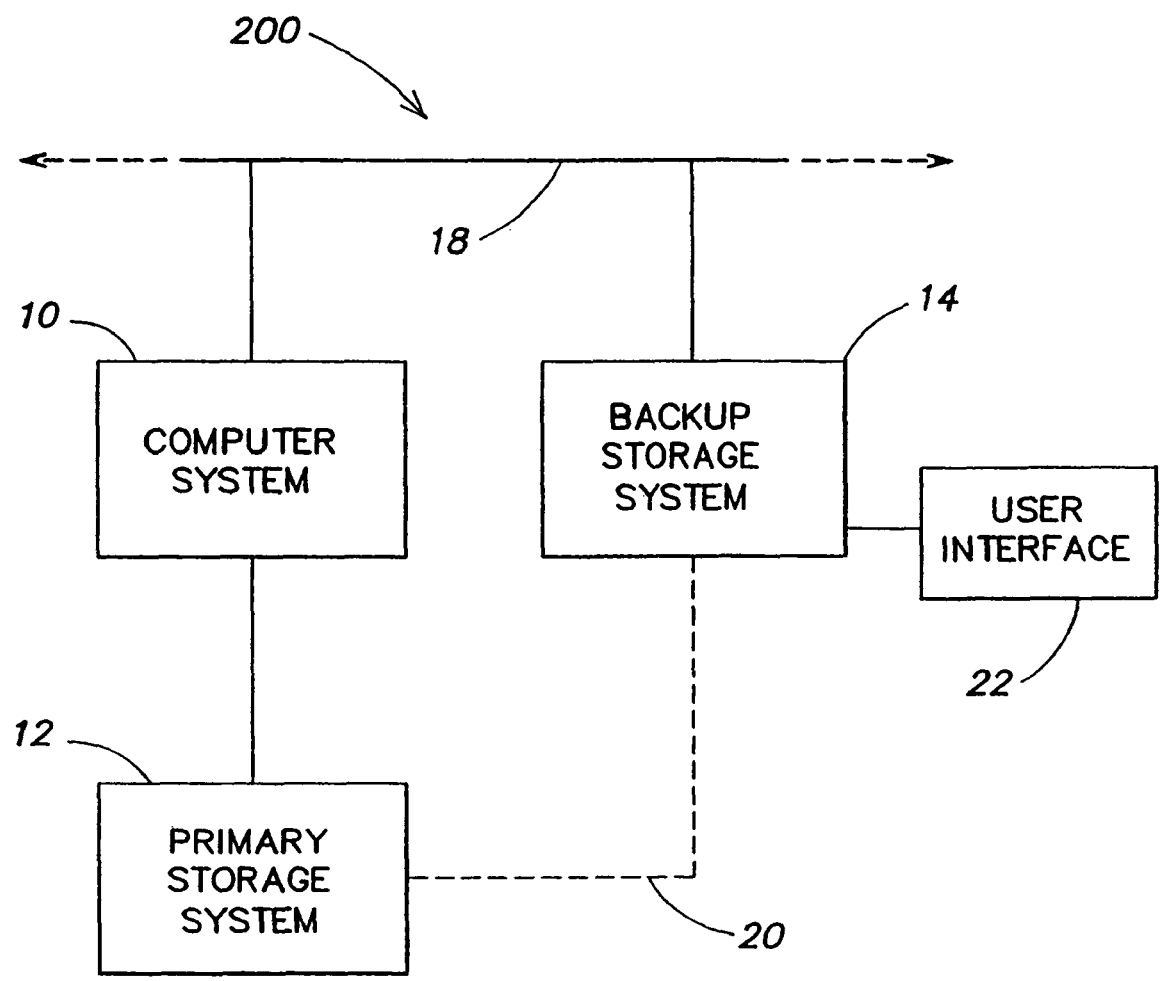
FIG. 1 is a diagram showing a conventional computer environment including a primary data storage system and a backup data storage system.
Figure 2:
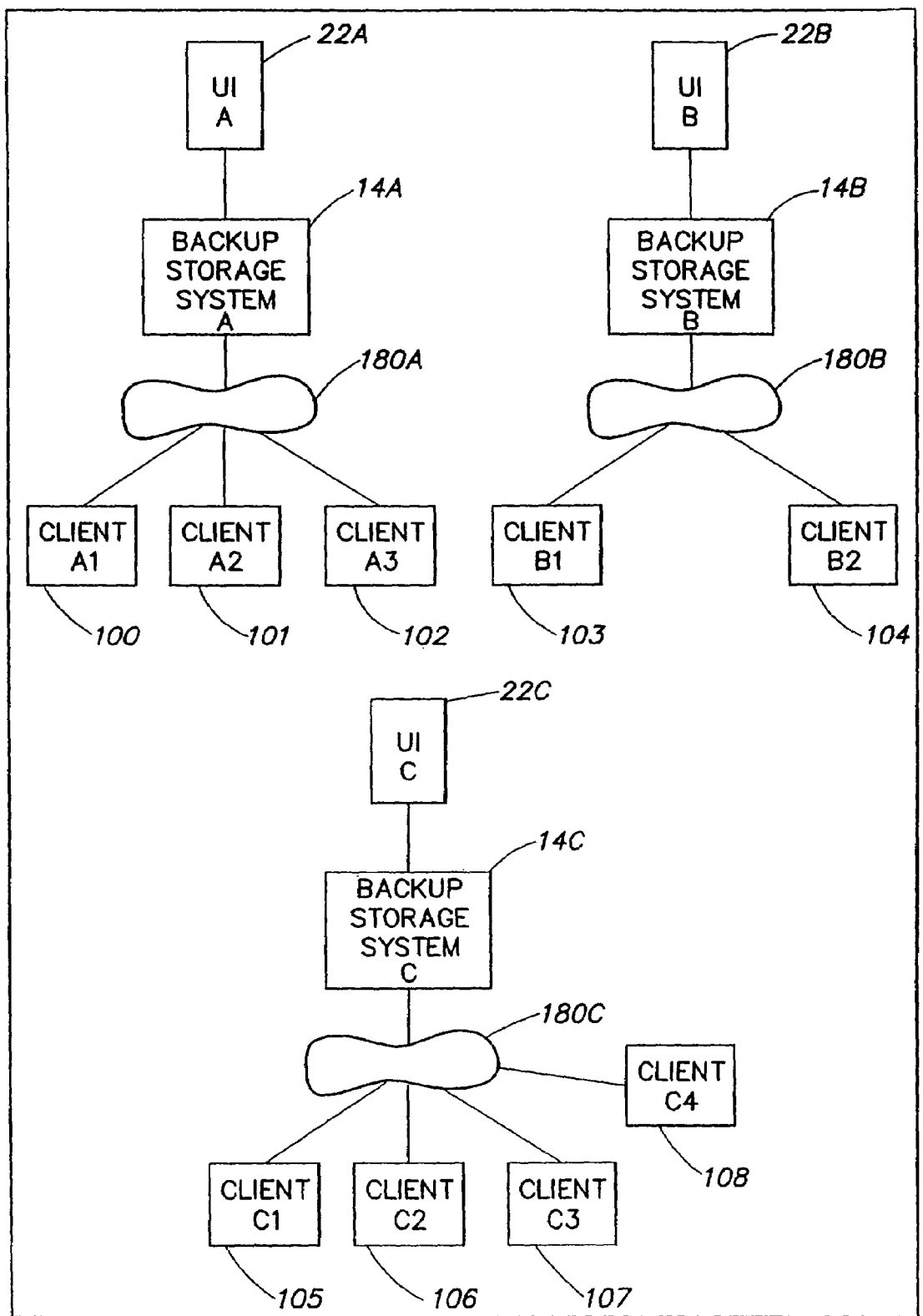
FIG. 2 is a diagram showing a conventional computer environment including a number of backup data storage systems each serving one or more clients.

As discussed above, a user in an environment like the computer environment 202 shown in FIG. 2 (i.e., an environment including a number of backup storage systems serving a number of clients) must go to each user interface individually to obtain information related to the backup activities of the backup storage system associated therewith. Applicants have appreciated that this is inconvenient and time consuming, and that it would be beneficial to enable a user to access two or more backup storage systems from a single location. Accordingly, one embodiment of the present invention is directed to managing information related to storage activities of one or more data storage systems, and enables a user to manage information relating to two or more backup systems from a single location. The managing of information can include any of a variety of functions, including, but not limited to, accessing, organizing, displaying, printing, transporting, distributing (E-mailing), and/or archiving information.

For example, one embodiment of the present invention is directed to a method and apparatus for managing information related to backup activities of two or more independent backup data storage systems coupled together and each serving one or more clients. In this embodiment, a user may obtain information related to backup activities of any of the backup storage systems from a single location. In particular, through a user interface associated with any of the backup storage systems, or through a stand alone user interface coupled to the backup storage systems, a user may manage (e.g., display and/or print) information related to backup activities of any or all of the backup storage systems. In another embodiment, a stand alone user interface may be coupled to one or more backup storage systems via a non-dedicated path (e.g., a network) to manage information related to the backup activities of the backup storage systems.

In one aspect of the invention, the information related to the backup activities of one or more backup storage systems may be organized as a report having a variety of formats. In another aspect, the information displayed in the report may be dynamically updated to provide for active monitoring of one or more backup storage systems. In yet another aspect, periodic backup activity reports can be automatically generated (or updated) and automatically sent to designated locations, for example to one or more printers and/or to one or more designated recipients via E-mail. These and other aspects and embodiments of the invention are discussed in greater detail below.

It should be appreciated that the embodiments of the invention outlined below in connection with methods and apparatus for managing information related to storage activities of data storage systems may be implemented in any of numerous ways, as the invention is not limited to any particular manner of implementation. Examples of specific implementations are provided for illustrative purposes only.

Figure 3:
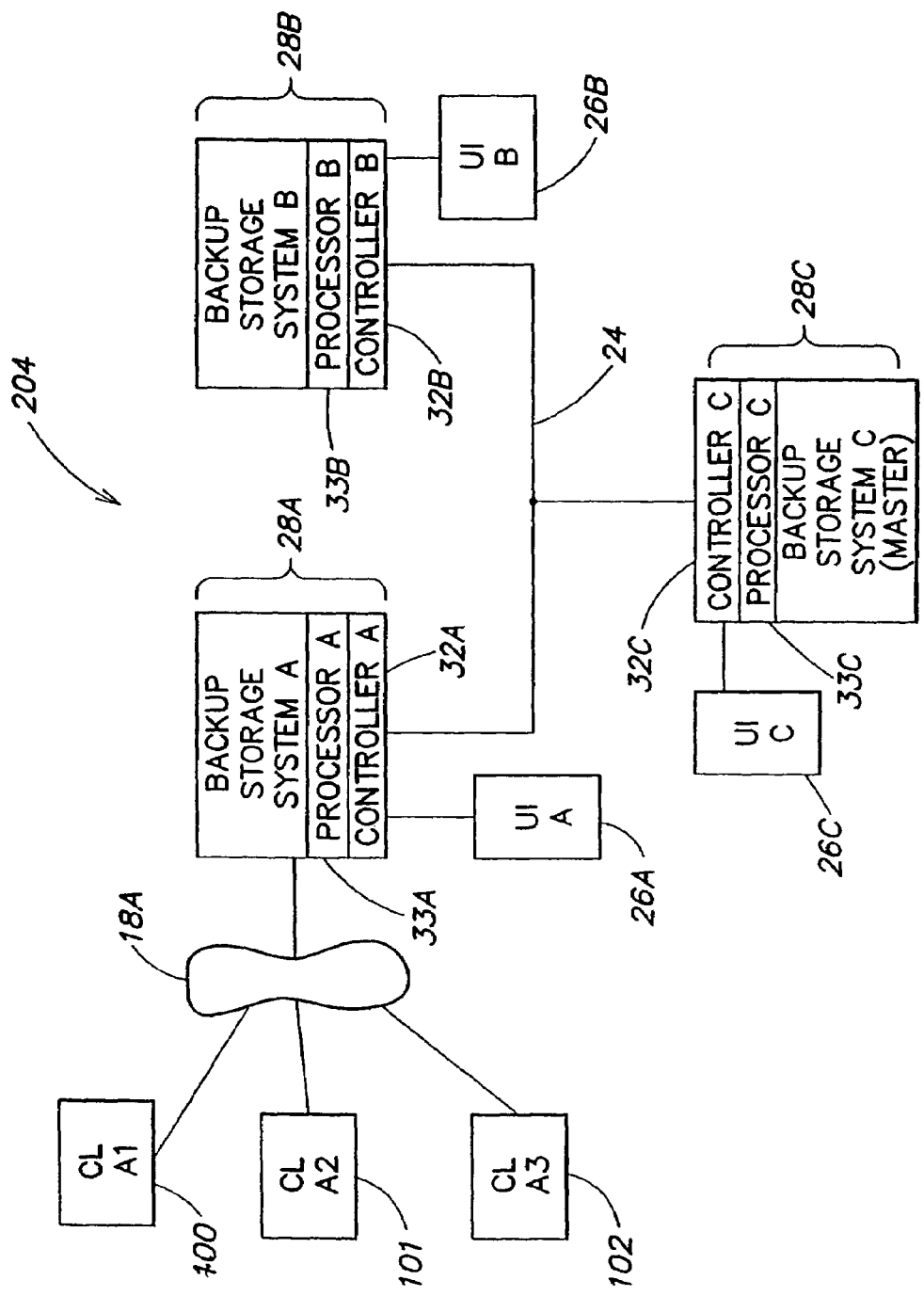
FIG. 3 is a diagram showing a computer environment including a number of coupled backup data storage systems, according to one embodiment of the invention.

FIG. 3 shows a computer environment 204 according to one embodiment of the invention, in which multiple backup storage systems 28A, 28B, and 28C are coupled together via line 24. Each backup storage system 28A, 28B, and 28C includes one or more controllers 32A, 32B, and 32C coupled to the line 24. The controllers perform a variety of functions related to communications between the backup storage systems 28A, 28B, and 28C over the line 24. Additionally, each backup storage system in FIG. 3 includes a processor 32A, 32B, and 32C (e.g., a host computer or general purpose processor, or a dedicated special purpose processor), and one or more storage devices (not shown). It should be appreciated that while FIG. 3 shows three backup storage systems, any number of backup storage systems (e.g., two or more) may be coupled together via the line 24. Additionally, it should be appreciated that the line 24 may represent a dedicated connection between the backup storage systems or a non-dedicated connection such as an open network connection, as discussed further below.

FIG. 3 also shows that a user interface 26A, 26B, and 26C is associated with each backup storage system 28A, 28B, and 28C. While FIG. 3 shows each user interface as a discrete apparatus separate from the backup storage systems for purposes of illustration, alternatively all or a part of a user interface may be incorporated as an integral part of a backup storage system as one of several elements forming the backup storage system. Additionally, it should be appreciated that not every backup storage system in a given computer environment requires a user interface. For example, according to other embodiments discussed further below, one user interface, either as a stand alone component or partially or fully integrated with a backup storage system, may be employed in a computer environment to communicate with a number of backup storage systems.

In the embodiment of FIG. 3, each user interface 26A, 26B, and 26C is shown coupled to a corresponding one of the controllers 32A, 32B, and 32C. The controllers control the flow of information to and from the user interfaces. FIG. 3 also shows that the backup storage system 28A is coupled to a number of clients 100, 102, and 104 via a network 18A. While not explicitly shown in FIG. 3, each of the backup storage systems 28B and 28C similarly may be coupled to one or more clients, as shown for example in FIG. 2. Furthermore, clients may be coupled either directly or via a network to a particular backup storage system. For example, when the line 24 is a network, clients can be coupled to respective backup storage systems by the same network, as discussed further below in connection with FIG. 7.

In the computer environment 204 of FIG. 3, the backup storage systems 28A, 28B, and 28C can share or exchange information, via the line 24, related to their respective backup activities. More specifically, information related to the backup activities of any of the backup storage systems 28A, 28B, and 28C can be accessed and managed via any of the user interfaces 26A, 26B, and 26C. For embodiments of the invention in which each backup storage system is not associated with a respective user interface, information related to the backup activities of any of the backup storage systems can be accessed and managed via an available user interface. This ability to access and manage information related to backup activities of a remote backup storage system is advantageous, as backup activity information can be accessed and managed without having to go physically to each backup storage system. Also, information related to the backup activities of all or any combination of backup storage systems in the computer environment can be organized into a single report, as discussed further below.

It should be appreciated that the embodiment of FIG. 3 illustrates merely one example of a physical configuration of two or more backup storage systems and clients on which aspects of the present invention can be implemented so that information can be shared or exchanged amongst the backup storage systems. The invention is not limited to implementation on such a configuration. As discussed further below, the present invention can be implemented in computer environments wherein the backup storage systems are coupled via any of numerous types of communication paths (e.g., dedicated paths, open network paths, etc.) to enable information to be communicated between them. Additionally, the communication paths between each backup storage system and one or more respective clients can be implemented in any of numerous ways (e.g., dedicated paths, open network paths, etc.). The present invention can be implemented on any computer system wherein backup systems are capable of communicating with each other and with their respective clients.

Furthermore, it should be appreciated that the invention is not limited to managing information related to backup activities of all backup storage systems in a given computer environment. For example, a computer environment including a number of backup storage systems may be subdivided into different "domains" of backup storage systems to share or exchange information in a particular manner. As used herein, the term domain refers to a computer environment in which two or more backup storage systems are coupled together and capable of sharing or exchanging information related to their backup activities. The term domain may also refer to a computer environment in which a stand alone user interface is coupled to one or more backup storage systems to obtain information from one or more of the backup storage systems, as discussed further below in connection with FIG. 7.

Figure 4:
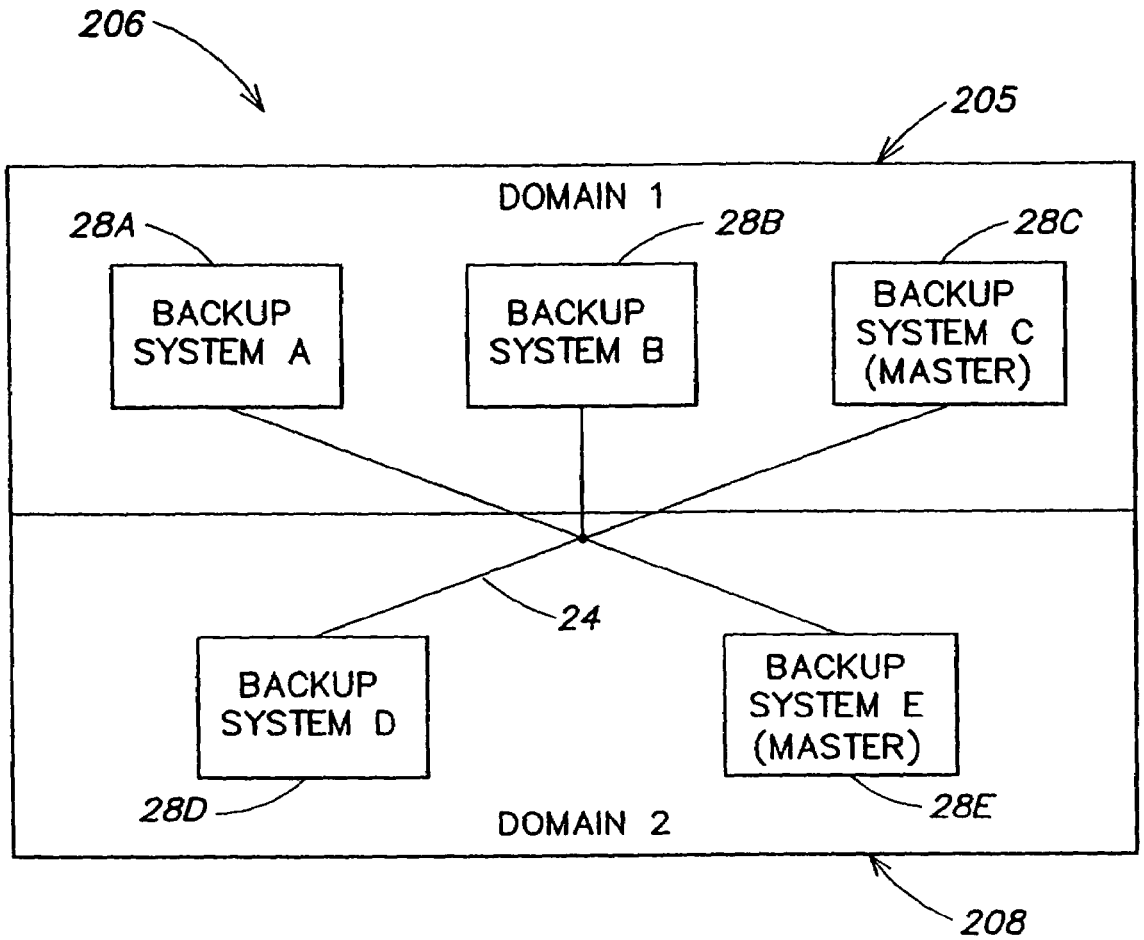
FIG. 4 is a diagram showing a domain configuration of a computer environment including a number of coupled backup data storage systems, according to one embodiment of the invention.

FIG. 4 shows an example of a computer environment 206 according to one embodiment of the invention that includes multiple domains. In particular, FIG. 4 shows five backup data storage systems 28A, 28B, 28C, 28D, and 28E coupled together via the line 24. Each of the backup data storage systems shown in FIG. 4 may include a processor and one or more controllers, and may be associated with a user interface and one or more clients, as discussed above in connection with FIG. 3. However, for purposes of simplification and clarity, the processors, controllers, user interfaces, and clients that may be included in the computer environment 206 are not shown in FIG. 4. Additionally, it should be appreciated that while FIG. 4 shows five backup data storage systems coupled via the line 24, any number of backup data storage systems (e.g., two or more) may be coupled together via the line 24, as discussed above. As discussed above, the line 24 can be any type of connection (e.g., dedicated or open network).

In FIG. 4, the computer environment 206 is organized as two domains of backup storage systems. Within each domain, backup storage systems can share or exchange with each other information related to their respective backup activities. In particular, FIG. 4 shows that the computer environment 206 is divided into a first domain 205 (corresponding to the domain 204 of FIG. 3) which includes three backup storage systems 28A, 28B, and 28C, and a second domain 208 which includes two backup storage systems 28D and 28E. The backup storage systems included in a given domain are referred to as participants of that domain. While FIG. 4 shows two domains for purposes of illustration, it should be appreciated that the backup storage systems in a given computer environment may be organized into any number of domains.

In one aspect of the embodiment of FIG. 4, information is only exchanged between the backup storage systems (participants) of the same domain. For example, in one aspect, information related to the backup activities of any of the five backup systems 28A-28E shown in FIG. 4 may only be exchanged amongst domain participants of the same domain. In particular, a user at a user interface associated with any one of the backup systems 28A, 28B, and 28C may only access information related to the backup activities of the systems 28A, 28B, and 28C, and not of the backup systems 28D and 28E. Similarly, a user at a user interface associated with any one of the backup systems 28D and 28E may only access information related to the backup activities of the systems 28D and 28E, and not of the backup systems 28A, 28B, and 28C.

The organization of backup storage systems into multiple domains, according to one embodiment of the invention, provides a number of advantages. For example, a multiple domain configuration of backup storage systems permits a variety of security measures to be implemented in connection with the exchange of information between backup storage systems. Additionally, a multiple domain configuration of backup storage systems can facilitate the organization of computer systems having a large number of backup storage systems into functionally related units. It should be appreciated that domains according to the invention can be implemented in any of numerous ways, and that the example shown in FIG. 4 is for purposes of illustration only.

In one embodiment of the invention, one participant in each domain is designated as a "domain master." For example, as shown in FIG. 3, the backup system 28C is designated as the domain master of the domain 204 (and, likewise, the corresponding first domain 205 in FIG. 4). Similarly, as shown in FIG. 4, the backup system 28E is designated as the domain master of the second domain 208. The domain master performs a variety of functions that ensure that backup systems in a domain can share or exchange information, but that information is not shared outside the domain. For example, the master can provide authorization to domain users and participants, which maintains security within a given domain. Additionally, in one embodiment, the domain master may serve as a central storage facility to store domain configuration information and report formats for organizing backup activity information, as discussed further below.

A system administrator may configure a computer environment that includes one or more backup storage systems into one or more domains. For example, with reference to FIGS. 3 and 4, via a user interface associated with any backup storage system in the computer environments 204 and 206, a system administrator may configure a particular domain by designating which backup storage systems in the computer environment are domain participants, and further designating one of the participants as a domain master. Additionally, a system administrator may designate a number of authorized users that may access information from the domain participants, and may also designate other authorized system administrators, or "domain administrators," that are privileged to configure a particular domain. In this aspect, each authorized user and domain administrator may be given respective passwords to "log-on" to a user interface associated with any domain participant.

As mentioned above, in yet another embodiment of the invention, system administrators may create and store report formats (templates) for managing the shared or exchanged information related to backup activities of domain participants. For example, the report formats may be designed to display and/or print in a predetermined manner various parameters associated with backup activities of any of the domain participants in a particular domain. Examples of report formats for managing the backup activity information of domain participants, as well as examples of the various parameters and types of information related to backup activity that may be available from the domain participants and organized in a report format, are discussed in greater detail below.

According to yet another aspect, a domain configuration created by a system or domain administrator, including an identification of participant backup storage systems and authorized domain users and other administrators (and any respective passwords for users), as well as backup activity report formats, as discussed above, may be stored in the domain. In one embodiment, the information is stored in the domain master. It should be appreciated, however, that the invention is not limited in this respect, and that in other embodiments domain configuration and authorization information, as well as report formats, may be stored elsewhere (e.g., in a domain participant or another computer device distinct from the backup storage systems), either in one central location or in a distributed manner. Additionally, it should be appreciated that while domain configuration and authorization information and report formats common to a domain may be centrally stored in the domain master, each backup system (participant) in a domain, including the domain master, may locally store information related to its own backup activities.

Figure 5:
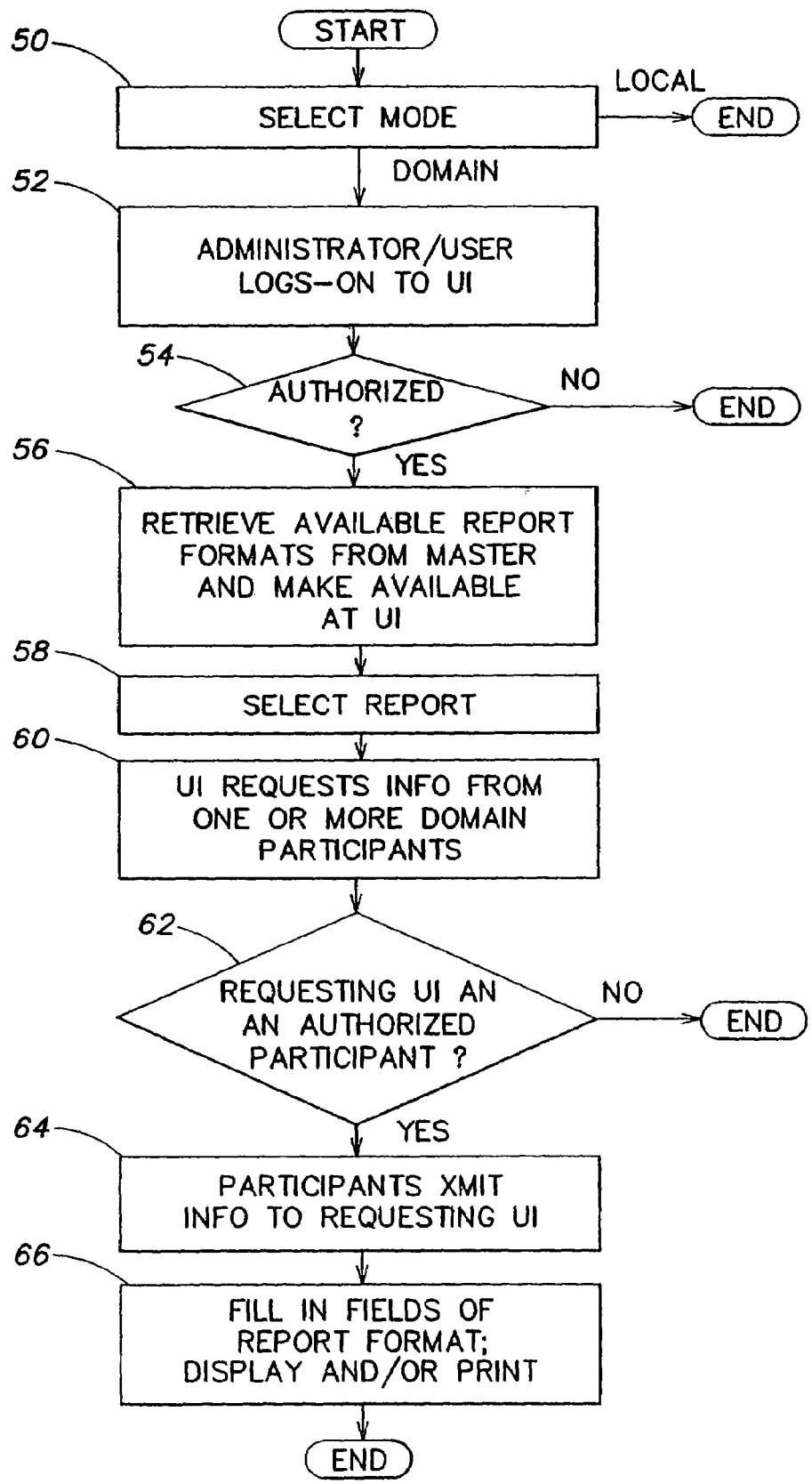
FIG. 5 is a flow chart showing a method for accessing information from one or more backup data storage systems in the computer environment of FIG. 3, according to one embodiment of the invention.

FIG. 5 is a flow chart showing an example of a method for accessing information related to backup activities of any backup data storage system in the domain 204 of FIG. 3 (or the domain 205 of FIG. 4) from any user interface 26A, 26B, and 26C, according to one embodiment of the invention. It should be appreciated that the method of FIG. 5 is provided only as an example, and that the sharing of information among backup storage systems can be implemented differently. For example, the exemplary method of FIG. 5 is for use with the embodiment of the invention wherein the domain configuration information and report formats are centrally stored in the domain master. As discussed above, the invention is not limited in this respect, as such information may be stored elsewhere.

In step 50 of FIG. 5, a user at a user interface first selects between a local mode and a domain mode. In the local mode, the user may only access information from the backup system directly coupled to the user interface being used by the user. This mode requires no authorization. Alternatively, in the domain mode, an authorized user may access information from any domain participant. Accordingly, in domain mode, the user first logs-on to the user interface (e.g., by entering a user name and optionally a password), as indicated in step 52 of FIG. 5, after which the authorization of the user to access information from domain participants is verified in step 54.

The user authorization is verified in step 54 of FIG. 5 by, for example, comparing the user name (and optional password) to the domain configuration information accessible to the user interface (e.g., stored in the domain master). Such a comparison can be done in any of numerous ways, and the invention is not limited in this respect. For example, once the user logs-on in step 52, a controller of the backup storage system to which the user interface is coupled (FIG. 3) can send a request to the domain master to verify the authorization of the user. In one aspect of this embodiment, such a request/verification procedure is performed even if the user interface from which the user logs-on is the domain master (i.e., all log-ons from any user interface in the domain are verified at the domain master). The domain master in turn sends a message back to the requesting user interface indicating whether or not the user is authorized.

If the user is authorized, in step 56 of FIG. 5 a list of the available report formats (stored in the domain master in this example) for managing backup activity information of domain participants is retrieved from the domain master and made available to the user at the user interface. Each report format represents a particular organization of information to be displayed and/or printed in connection with the backup activities of one or more of the domain participants. Examples of the types of information that are accessible from each domain participant (and which may be included in a given report format) include, but are not limited to, the name of the domain participant (server), the name of the client for which the backup operation was performed, an identifier for the backup operation (work item), the date and time of the backup operation, and the status or state (e.g., successful, failed, active, or queued) of the backup operation. Additionally, a report format may include aggregate backup activity information, for example, the total data throughput of a particular domain participant within a given date and time period, the total number of successful or failed backup operations, etc.

In the above-discussed embodiment, it should be appreciated that only the report format is stored in the domain master, and not all of the actual underlying report information from each domain participant that is organized in the report format each time a report is generated. Of course, as discussed above, the domain master may store its own backup activity information.

Once the list of report formats is available to the user at the user interface, in step 58 of FIG. 5 the user selects one of the report formats. Upon selection of a report format, in step 60 the controller of the backup storage system to which the user interface is coupled (FIG. 3) sends an information request to any of the domain participants included in the selected report format. As discussed above, each domain participant stores information related to its own backup activities. It should be appreciated that although the user selects a report format which determines the type of information requested and from which backup storage system the information is requested in the embodiment discussed above, the invention is not limited in this respect. For example, in other embodiments, the user can request any type of information available from any of the backup storage systems without relying on a particular report format.

At each domain participant from which information is requested, the controller at the domain participant receives the information request, and in step 62 of FIG. 5, verifies that the requesting user interface is authorized to access the information. Such a verification step can be implemented in any of numerous ways, and the invention is not limited to any particular manner of verification. For example, in step 52 of the embodiment of FIG. 5, the receiving controller sends a domain participant verification request to the domain master to verify that the requesting user interface is indeed associated with a domain participant in the same domain as the system from which information is requested. Such a verification step provides a security mechanism in computer environments including multiple domains, as shown in FIG. 4. By verifying that information requests originate from domain participants, no backup activity information is inadvertently transmitted to an unauthorized requestor.

As with the user authorization verification discussed above, in one aspect of this embodiment, the domain participant verification step 62 in FIG. 5 is performed even if either the original information request or the domain participant verification request comes from the domain master (i.e., all information requests are verified at the domain master). The domain master in turn sends a message back to the domain participant that requested domain participant verification, indicating whether or not the user interface requesting information is authorized to receive it.

If it is determined in step 62 that the user interface requesting information is authorized, in step 64 of FIG. 5 the controller of the domain participant receiving an information request transmits the backup activity information of the queried domain participant to the requesting user interface. The transmitted information is received by the controller of the backup storage system associated with the requesting user interface. After receiving the backup activity information from each queried domain participant, in step 66 various fields of the report format are filled in with the appropriate information, and the completed report is displayed and/or printed by the user interface. Additionally, as discussed further below, in one embodiment the completed report may be transmitted to one or more recipients via E-mail, printed at one or more remote destinations, and/or may be stored as a file.

In sum, according to the method of FIG. 5, an authorized domain user or administrator may employ a user interface associated with any domain participant, or a stand alone user interface, to request information from any backup storage system that is a domain participant. The authorized user first logs-on to a user interface, receives a list of available report formats, and selects a particular report format. One or more domain participants are then queried to transmit information related to their respective backup activities to the user interface employed by the user (the requesting user interface). Upon the receipt of an information request, each queried domain participant verifies the authorization of the requesting user interface with the domain master. Upon verification by the domain master, the queried participants transmit their respective information to the requesting user interface, and the information is organized and made available (e.g., displayed, printed, E-mailed, stored) according to the report format. Again, it should be appreciated that the foregoing method is provided only as an example of one possible implementation, as this embodiment of the invention may be implemented in numerous other ways.

As discussed above, according to one embodiment of the invention, only system or domain administrators may create and store report formats. This is advantageous in that it can prevent inadvertent changes to the organization of information by less experienced system users. However, in one aspect of this embodiment, any authorized domain user that selects a particular report format (e.g., FIG. 5, step 58), may edit the report format to customize the content and organization of a report for their immediate purposes, and may store the completed customized report containing the information from queried domain participants as a data file. However, users who are not administrators may not save their customized report format, for example, in the domain master or other storage area. Editing and customizing backup activity reports is discussed in greater detail below in connection with FIGS. 8-14, which illustrate some examples of graphical representations displayed by a user interface according to one embodiment of the invention. Again, it should be appreciated that the invention is not limited to providing access to only specific administrators to modify report formats, as in other embodiments any user may be allowed to create and store report formats.

According to another embodiment of the invention, some steps of the method of FIG. 5 may be repeated periodically to provide an updated or refreshed backup activity report for one or more domain participants. Such a refresh feature may be built into a report format by a domain administrator so that a report is refreshed automatically whenever it is generated, or may be invoked by an authorized user once a particular report format is selected. Alternatively, if a report format includes a built in refresh feature, a user may turn off the feature if so desired.

Figure 6:
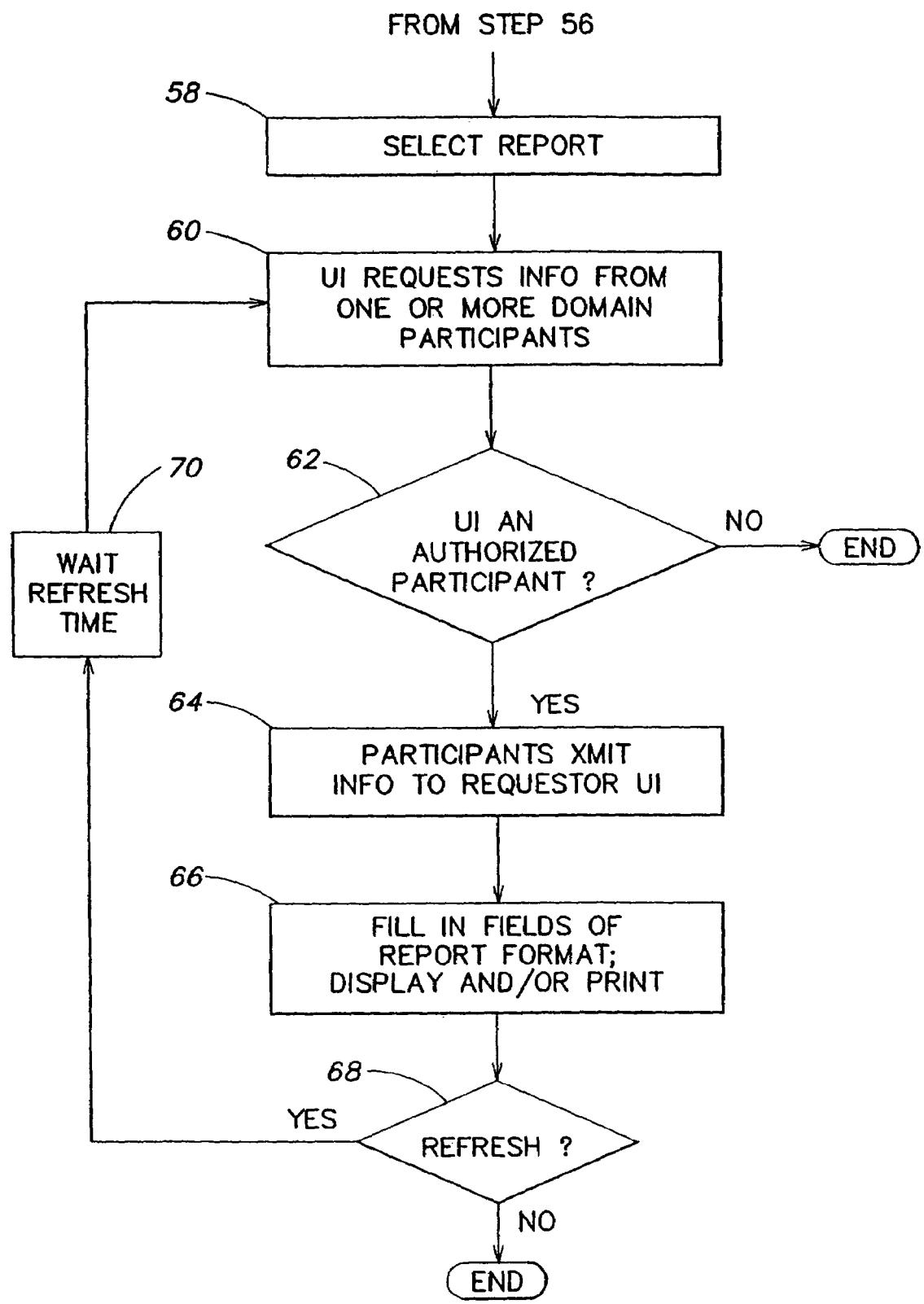
FIG. 6 is a flow chart similar to that shown in FIG. 5, illustrating a modification to the method of FIG. 5 according to one embodiment of the invention.

FIG. 6 is a flow chart showing some of the steps of the method of FIG. 5, along with additional steps related to the refresh feature discussed above. In particular, FIG. 6 shows that after the step 66, in which information related to the backup activities of one or more domain participants is filled in to the selected report format, in step 68 the method determines if the refresh feature has either been indicated in the report format or selected by a user. If the refresh feature is indicated or selected, in step 70 the method waits a prescribed refresh time before returning to step 60, at which point one or more domain participants are again queried for information relating to their backup activities. The refresh time may be specified as a refresh rate at the time the refresh feature is selected. According to one embodiment, refresh rates may be specified, for example, in a range of from 30 seconds to 10 minutes.

The refresh feature described above may be particularly useful for continuous monitoring of backup activities of one or more domain participants. For example, in addition to ascertaining the success or failure of one or more completed backup operations (work items), an authorized user may monitor any changes in the status of currently active or pending (queued) work items in real time via the refresh feature. In this manner, failed work items may be more readily identified, which may be advantageous in some applications. The refresh feature is discussed further below in connection with FIG. 14, which illustrates an example of a graphical representation displayed by a user interface according to one embodiment of the invention.

According to another embodiment of the invention, completed reports of information related to the backup activities of one or more backup storage systems may be generated (or updated) automatically and/or periodically. Such reports may be stored as files and/or distributed to one or more designated destinations, such as printing devices and various recipients via E-mail. In this embodiment, a domain administrator may create a report format that includes an identifier (or tag) to indicate that a report based on the report format is to be generated automatically and/or periodically. Such an identifier may include or point to, for example, information regarding the date and time at which a report is to be generated (i.e., the days of the week or dates of the month), one or more printers and/or E-mail recipients to which the report is to be sent, or a file name under which the report is to be stored. Automatic and periodic report generation is discussed in greater detail below in connection with FIGS. 12 and 13, which illustrate some examples of graphical representations displayed by a user interface according to one embodiment of the invention.

It should be appreciated that the above-discussed automatic and periodic report generation feature of the present invention may be implemented apart from other aspects of the invention. For example, the automatic and periodic report generation feature may be implemented in connection with only one backup storage system, and is not limited to use in environments wherein backup information from more than one backup storage system is included in a report, or in which a report is requested from a user interface remote from the backup storage system.

Figure 7:
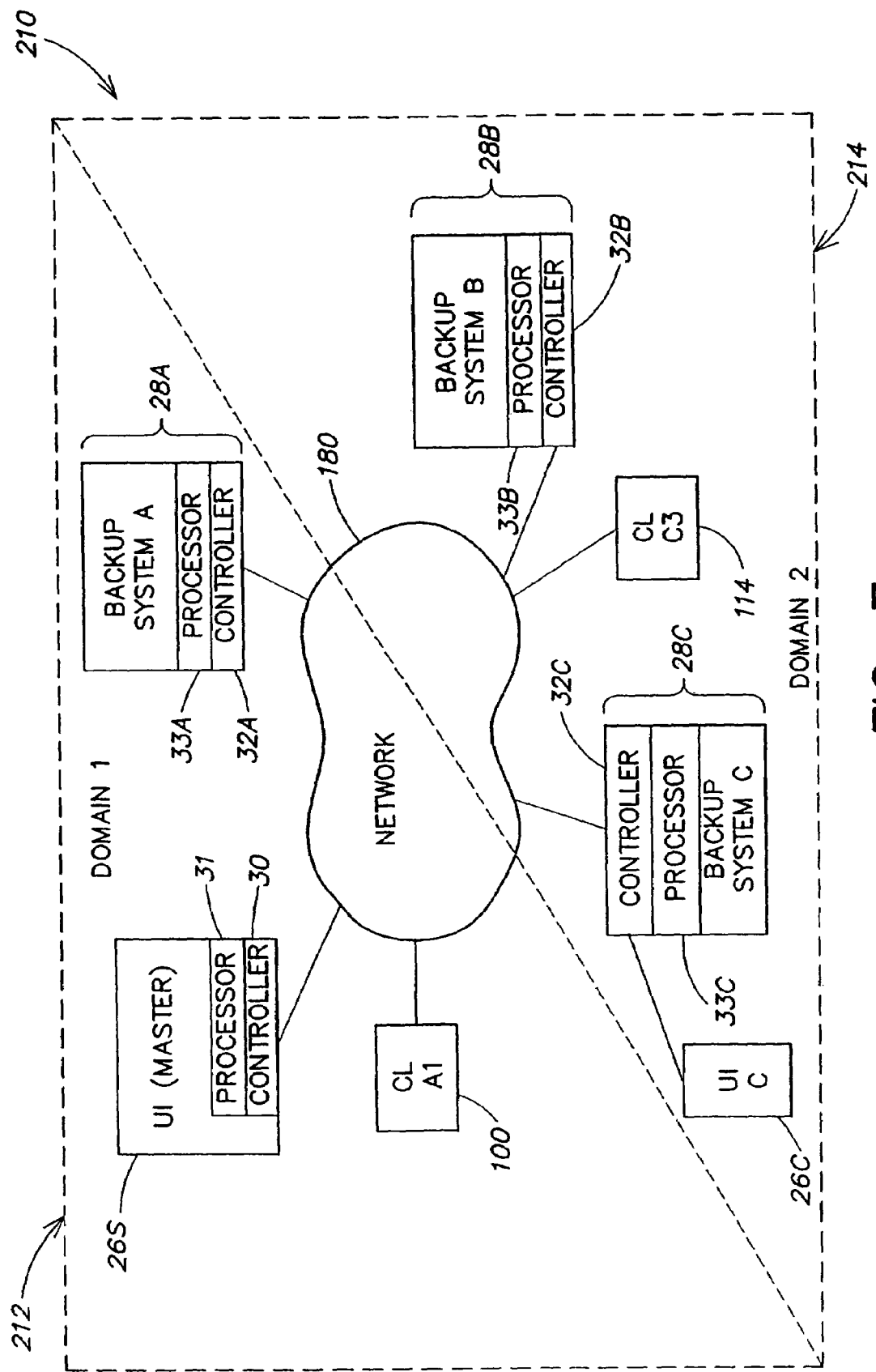
FIG. 7 is a diagram showing a computer environment including a number of coupled backup data storage systems, according to another embodiment of the invention.

FIG. 7 shows yet another computer environment 210 including a stand alone user interface 26S and one or more backup storage systems, according to another embodiment of the invention. In the embodiment of FIG. 7, the stand alone user interface 26S and backup storage systems 28A, 28B, and 28C are coupled to a network 180. The network 180 of FIG. 7 may be an open network whose resources are not exclusively dedicated to transporting information amongst the backup storage systems 28A, 28B, and 28C and the user interface 26S. For example, in the embodiment of FIG. 7, the network 180 may be coupled to one or more backup storage systems that are participants in the same or different domains, as well as one or more clients that are associated with any of the backup storage systems (e.g., FIG. 7 shows the client 100 which is associated with the backup storage system 28A, and the client 114 which is associated with the backup storage system 28C, both coupled to the network 180). Any number and variety of computer devices (whether or not associated with the backup storage systems) may be coupled to the network 180. Also, it should be appreciated that while FIG. 7 shows three backup storage systems coupled to the network, the embodiment of FIG. 7 is not limited in this respect, as any number (one or more) of backup storage systems may be coupled to the network 180.

While FIG. 7 shows the stand alone user interface 26S coupled to the network 180, it should be appreciated that the invention is not limited in this respect. For example, according to one embodiment of the invention, information related to backup activities of a first backup storage system may be transported between a stand alone user interface and the first backup storage system over a path that is not dedicated to transporting the information between the stand alone user interface and the first backup storage system. Such a path could be provided by the network 180, as discussed above. Alternatively, for example, a first backup storage system may transmit and/or receive information from the stand alone interface via a second backup storage system. In particular, according to one embodiment of the invention, a first backup storage system first transmits information related to its backup activities to a second backup storage system, and the second backup storage system relays the information related to the backup activities of the first backup storage system to the stand alone user interface.

At least one advantage provided by the stand alone user interface 26S of FIG. 7 is that a user may conveniently manage information related to the backup activities of one or more backup storage systems, in some cases from a remote location. For example, the stand alone user interface may be located in a location convenient to users who will monitor the status of the system, and can be located remotely from the backup storage systems being monitored, which may be geographically dispersed over a wide area.

FIG. 7 shows that the stand alone user interface 26S may include a processor 31, one or more controllers 30, and a memory or one or more storage devices (not shown). It should be appreciated that the configuration including the stand alone interface 26S shown in FIG. 7 is merely an example, and that the invention is not limited to this particular configuration. In addition, while not explicitly shown in FIG. 7, one or more additional stand alone user interfaces may be also coupled to the network 180.

In addition to stand alone user interfaces, the computer environment 210 of FIG. 7 may also include one or more user interfaces that are associated with the backup storage systems coupled to the network 180. For example, FIG. 7 shows the user interface 26C associated with the backup storage system 28C. As discussed above, the user interface 28C may be a discrete apparatus coupled to the backup storage system 28C, as shown in FIG. 7, or may be included as one element of an integrated package constituting the backup storage system 28C. Additionally, it should be appreciated that while only one user interface 26C is shown in FIG. 7, each of the backup storage systems 28A and 28B may also be associated with a respective user interface, as shown for example in the embodiment of FIG. 3. However, the embodiment of FIG. 7 is not limited in this respect, as one or more backup storage systems may not be associated with any user interface.

In the embodiment of FIG. 7, the computer environment 210 may be organized as one or more domains, as discussed above in connection with the embodiment of FIG. 4. In particular, domain participants may include both stand alone user interfaces and backup storage systems (with or without an associated user interface), and either a stand alone user interface or a backup storage system (with or without an associated user interface) may be designated as domain master.

For example, FIG. 7 shows that the computer environment 210 has been organized into a first domain 212 that includes the stand alone user interface 26S and the backup storage system 28A, and a second domain 214 that includes the backup storage systems 28B and 28C. In the first domain 212, the stand alone user interface 26 serves as the domain master, and in the second domain 214 the backup storage system 28B serves as domain master. It should be appreciated that the particular domain organization and designation of domain masters in the forgoing example is for illustrative purposes only, and that the embodiment of FIG. 7 is not limited in this respect.

In the embodiment of FIG. 7, an authorized user at any user interface in a particular domain, including a stand alone user interface 26S, may access information related to the backup activities of any backup storage systems in the same domain. In one implementation of the embodiment of FIG. 7, variations of the methods of FIGS. 5 and/or 6 may be employed to transport information between a requesting user interface and one or more queried domain participants. For example, one or more stand alone user interfaces 26S typically would not be queried as a domain participant from which backup activity information is accessed and retrieved, as a stand alone user interface would not be designated in a particular report format as having backup activity information to access.

As discussed above, a stand alone user interface could indeed serve as a domain master, as is the case illustrated in FIG. 7 for the first domain 212. Hence, in addition to one or more controllers 30 to perform various functions, including communication via the network 18 with other domain participants, a stand alone user interface may include a memory (not shown) in which to store domain configuration and authorization information, as well as one or more report formats. Accordingly, a stand alone user interface serving as domain master may be queried during the method of FIG. 5 or 6 (e.g., in step 62) to verify the authorization of a domain participant requesting information from other participant backup storage systems, and to transmit report formats to a requesting domain participant.

The embodiments of FIGS. 3, 4 and 7 are merely examples of a number of possible computer environments in which various embodiments of the invention can be implemented. As discussed above, the present invention can be implemented in computer environments wherein the backup storage systems are coupled via any of numerous types of communication paths (e.g., dedicated paths or open network paths) to enable information to be communicated between them. Additionally, the communication paths between each backup storage system and one or more respective clients can be implemented in any of numerous ways (e.g., dedicated paths or open network paths). Thus, it should be appreciated that the invention is not limited to the computer environments shown in FIGS. 3, 4, and/or 7, or any other particular environment.

According to one embodiment of the invention, a multi-system graphical user interface (GUI) is provided that is capable of graphically representing various parameters associated with backup activities of one or more backup systems. This can be accomplished, for example, by GUI software installed on a host computer system in the backup storage system or the stand alone user interface. However, it should be appreciated that the present invention is not limited to employing a GUI, as other types of user interfaces (e.g., text based user interfaces) may be employed to display and/or print information related to the backup activities of a number of backup storage systems.

One example of a data storage system from which information may be accessed, according to various embodiments of the present invention, is the above-discussed EDM backup storage system, available from EMC Corporation of Hopkinton, Mass. For example, the EDM backup storage system can be provided with a multiple EDM graphical user interface (GUI) to enable a user to conveniently access information from other EDM backup storage systems.

Backup storage systems or stand alone user interfaces may operate in a UNIX or UNIX related computer environment. Thus, described below is an illustrative implementation of aspects of the present invention for a UNIX environment. However, it should be appreciated that the invention is not limited in this respect, as the invention may be implemented in computer environments other than UNIX environments.

In UNIX environments, some computer processes which perform general maintenance or housekeeping functions of the computer system are referred to as "daemons." A UNIX daemon is essentially a server-type monitoring process that listens for service requests from, for example, other processes or devices related to the computer system, and then performs some function based on the request. A daemon may be implemented, for example, as a dedicated software routine or program module, or as dedicated hardware to receive one or more service requests and provide one or more output signals based on the service requests. Service requests to various software oriented daemons in a UNIX environment may be implemented using, for example, TCP/IP Remote Procedure Calls (RPC).

With reference again to FIGS. 3 and 7, in one embodiment of the present invention, any of the controllers 30, 32A, 32B, and 32C may represent one or more daemons which serve, for example, to monitor and control communication over the line 24 or the network 180, to monitor and control communication with a user interface (stand alone or associated with a backup storage system), and to transport information to and from a backup storage system. In particular, a daemon may listen for information and/or authorization requests on the line 24 or the network 180 and subsequently implement domain user authorization or domain participant verification procedures with a domain master. Similarly, a daemon may be employed to oversee the transmission of report formats from a domain master, and to transmit backup information of a particular backup storage system upon verification of a requesting user interface. Likewise, one or more daemons may be employed in a controller to monitor requests from a user interface (stand alone or associated with a backup storage system), to transmit the requests over the line 24 or the network 180, and to relay information received from the line 24 or the network 180 to the user interface for display and/or printing. In sum, a number of processes in a backup storage system UNIX environment may be accomplished by one or more daemons acting as controllers.

For example, according to one embodiment of the invention as discussed above, a domain administrator may create and save report formats from which reports are automatically and/or periodically generated and distributed to particular destinations, such as one or more printers and/or one or more E-mail recipients. In UNIX environments, automatic and/or periodic report generation according to the invention may be implemented, for example, by employing the UNIX CRON daemon, which continuously monitors a UNIX CRON tab file that includes a task list and designated times for the execution of each task in the task list. The particular report format to be used to generate an automatic and/or periodic report may be indicated along with a specified execution time in the UNIX CRON tab file task list.

Figure 8:
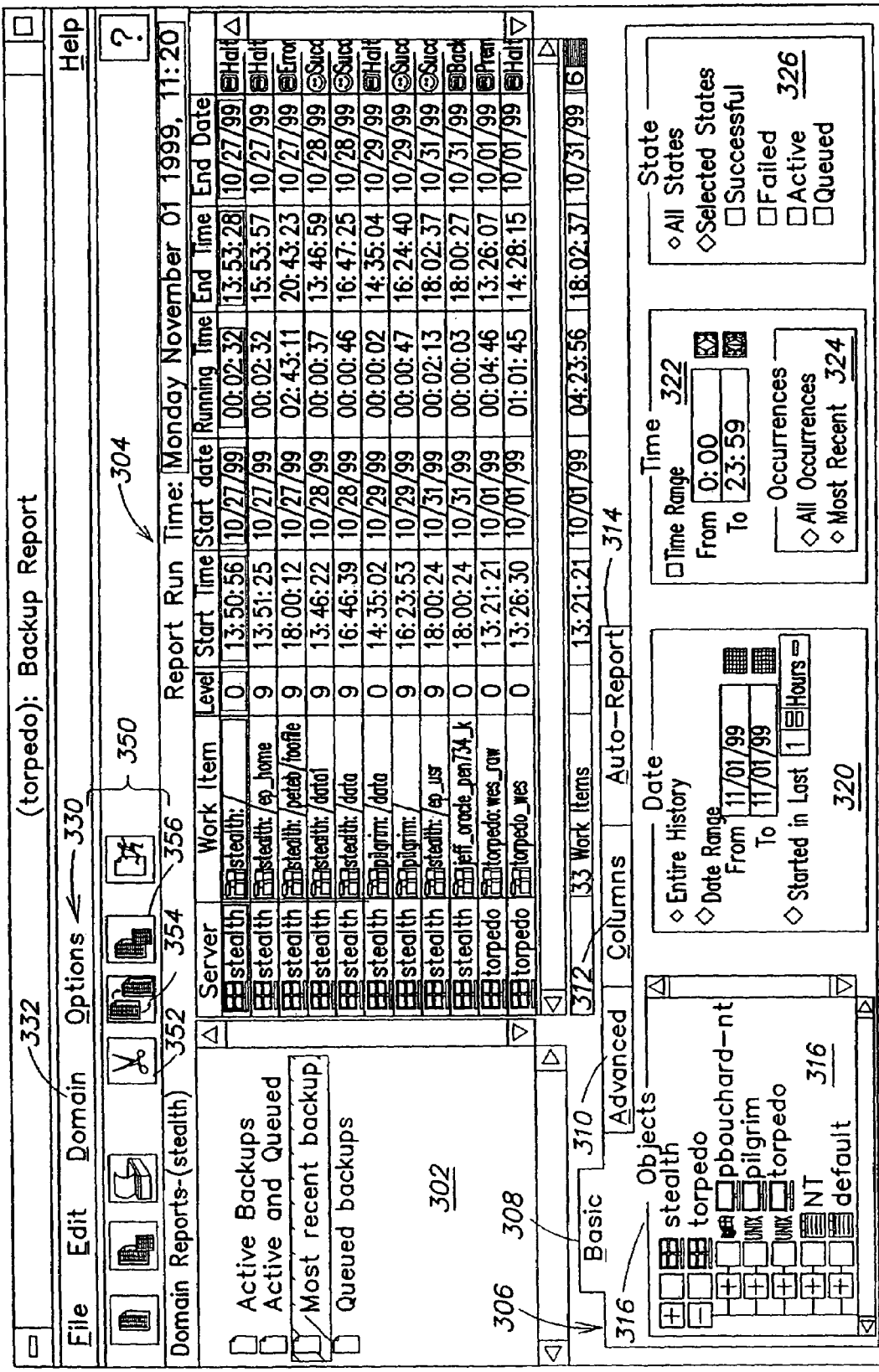
FIG. 8 is a graphical representation of a management window that can be provided by a user interface according to one embodiment of the invention, in connection with displaying backup activity reports generated according to the method of FIG. 5.

FIG. 8 illustrates an exemplary graphical representation of a management window 300 that may be displayed by a user interface in connection with backup activity status of one or more backup data storage systems, according to one embodiment of the invention. The window 300 displayed in FIG. 8 results from an authorized domain user having successfully logged-on to any of the user interfaces shown in the embodiments of FIGS. 3 and 7, for example, and having selected a particular report format for the display of information related to backup activities of one or more domain participant backup storage systems, as discussed above in connection with FIG. 5.

FIG. 8 shows that the management window 300 includes a report format listing section 302 (entitled "domain reports") which includes a list of all of the report formats stored in the domain master and available for selection by an authorized domain user. A selected report format in the section 302 may be indicated, for example, with a black background; hence, the report format entitled "Most Recent Backup" is shown selected in the graphical representation of FIG. 8.

The management window 300 shown in FIG. 8 also includes a report output section 304 arranged in a number of rows and columns that include the information retrieved from one or more backup storage systems in connection with their respective backup activities. The contents and organization of the information displayed in the report output section 304 is defined by a domain administrator in the report format that is selected by a user in the report format listing section 302, as discussed above. Accordingly, the report output section 304 in FIG. 8 displays the contents and organization of information according to the report format entitled "Most Recent Backup."

Near the top of the management window 300 shown in FIG. 8, a tool bar 350 includes a number of user-selectable buttons to initiate a variety of operations, such as, for example, saving a customized report format as a new report format, saving a completed report output section as a file, printing a completed report output section, and the like. In particular, the tool bar 350 includes a cut button 352, a copy button 354, and a paste button 356. The corresponding cut, copy, and paste functions invoked by selection of the buttons 352, 354, and 356 may be used by a domain administrator to create new report formats based upon existing report formats, and may be used by any authorized user to edit or customize a report format for a particular immediate purpose, as discussed further below.

Figure 9:
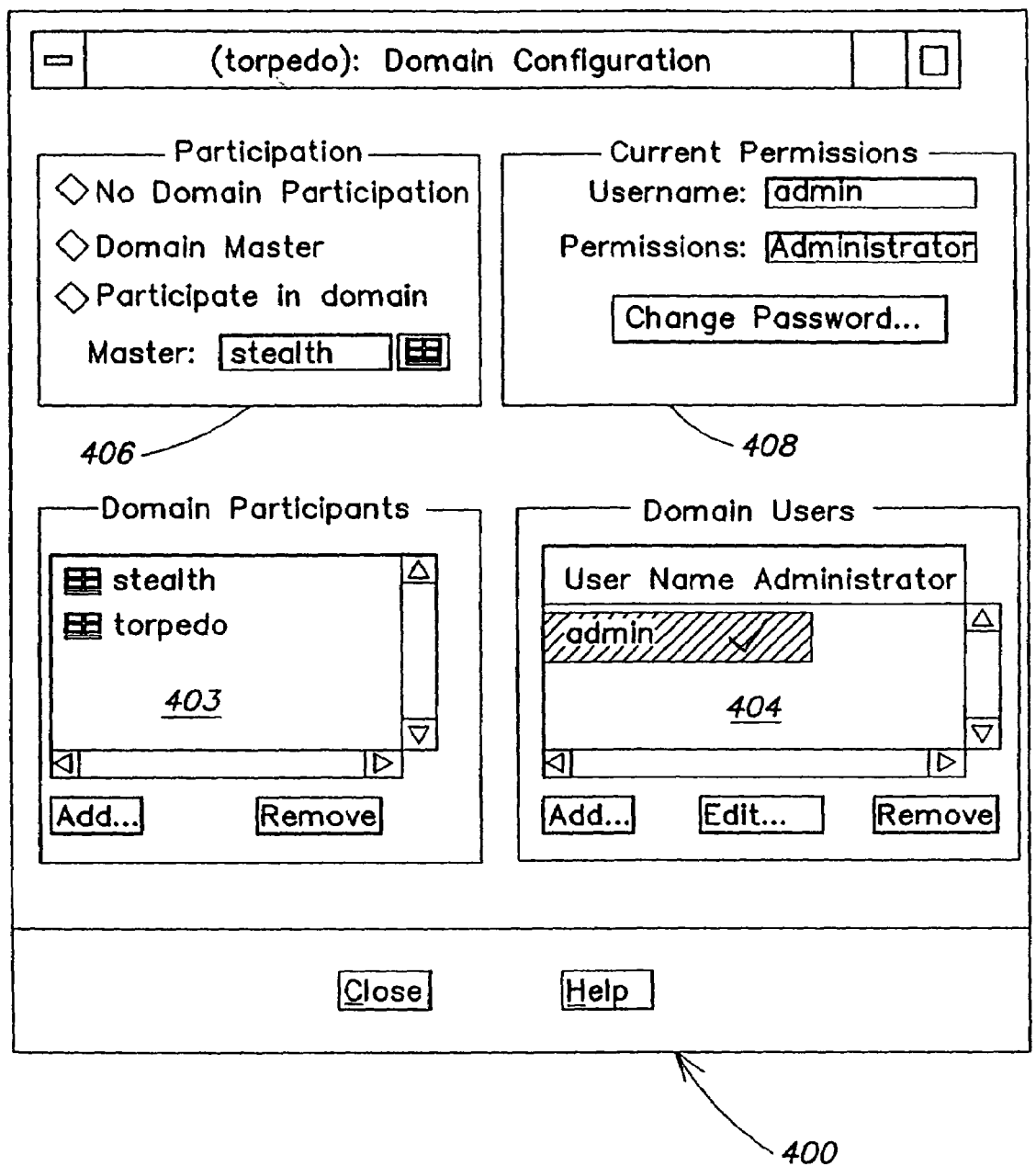
FIG. 9 is a graphical representation of a management window that can be provided by a user interface according to one embodiment of the invention, in connection with domain configuration.

At the top of the management window 300 shown in FIG. 8, a menu bar 330 includes a number of pull down menu options, including an option 332 labeled as "Domain." FIG. 9 is a graphical representation of a management window 400 that is provided by the user interface when the Domain option 332 is selected on the menu bar 330, according to one embodiment of the invention.

The domain configuration window 400 shown in FIG. 9 includes a domain participant section 402 which lists authorized domain participants by name (e.g., "stealth," "torpedo"), and a domain users section 404 which lists authorized domain users by name and indicates those users that are authorized as domain administrators. The domain configuration window 400 of FIG. 9 also includes a participation section 406 and a current permissions section 408, which allows the viewing or selection of current authorizations for domain users and participants. As discussed above, while any authorized user may view the domain configuration window 400 for current authorization status, in one embodiment of the invention only designated domain administrators can re-configure a domain and change user or participant status via the domain configuration window 400.

With reference again to FIG. 8, the management window 300 also includes a report filter section 306 which allows a domain user or administrator to edit or customize the organization and content of the report output section 304. As discussed above, while any user may customize a particular backup activity report, according to one embodiment of the invention, only domain administrators may save edited or customized report formats as new report formats stored in the domain master.

The report filter section 306 of the management window 300 shown in FIG. 8 includes buttons corresponding to four user selectable panels, namely, "Basic" 308, "Advanced" 310, "Columns" 312, and "Auto-report 314." Each of these panels is respectively displayed in the report filter section 306 of FIGS. 8, 10, 11, and 12, based upon the example of the selected report format entitled "Most Recent Backup." Once a user selects a report format from the report format listing section 302 (e.g. "Most Recent Backup"), each panel of the report filter section 306 displays particular information parameters chosen by the domain administrator to be included in the selected report format.

For example, the report filter section 306 of FIG. 8 shows the "Basic" panel 308 which includes the "Basic" information parameters included in the selected report format ("Most Recent Backup"). In particular, the Basic panel 308 includes an objects section 316 which lists the various objects (servers, clients) from which information may be accessed and retrieved to generate a report in the report output-section 304. The objects section 316 shown in FIG. 8 indicates that all processes running under the domain participants (servers) "stealth" and "torpedo" are to be displayed in the report output section 304. Additionally, the Basic panel 308 of FIG. 8 includes a date section 320 and a time section 322 for indicating and selecting date or time ranges for reported backup activities (work items). In the example of FIG. 8, the entire backup activity (work item) history of each object is selected in the date section 320, and no particular time range is selected in the time section 322.

The Basic panel 308 of the report filter section 306 shown in FIG. 8 also includes an activity occurrences section 324 for indicating and selecting an option of displaying (or printing) all occurrences of a particular backup activity (work item) or only the most recent occurrences. For example, for any given time or date period in the backup activity history of a domain participant, a given work item may have been performed several times. Rather than displaying or printing every occurrence of such a work item in a backup activity report, only the most recent occurrence of the work item may be included in the report output section 304 according to the "Most Recent" option in the activity occurrences section 324, which is shown as selected in the example of FIG. 8.

Finally, the basic panel 308 of the report filter section 306 in FIG. 8 includes a state (status) section 326 for indicating or selecting the inclusion of work items in the report output section 304 based on the particular status of each work item (e.g., successful, failed, active, queued). In the example of FIG. 8, the "All States" option is selected in the state section 326; hence, work items are displayed in the report output section 304 regardless of their particular state (status).

Figure 10:
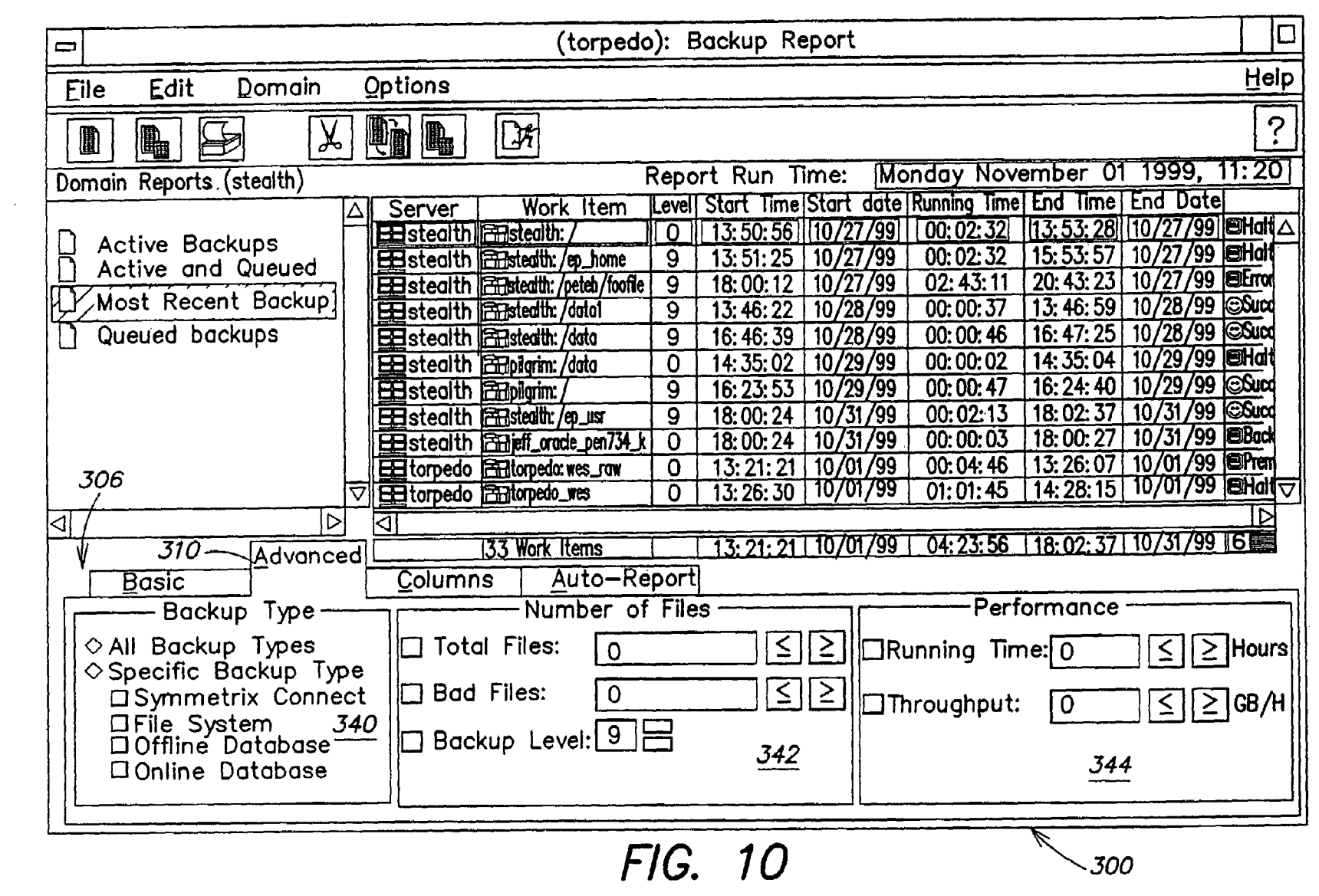

FIG. 10 is a graphical representation of the management window 300 in which the "Advanced" panel 310 is selected and displayed in the report filter section 306. The Advanced panel 310 includes a "Backup Type" section 340, a "Number of Files" section 342, and a "Performance" section 344 for indication and selection of these parameters in a manner similar to that described above in connection with the "Basic" panel 308 shown in FIG. 8. For example, in the Backup Type section 340, all backup types or specific backup types may be selected for a report format or for a customized report. Examples of specific backup types include Symmetrix Connect backups, file system backups, offline database backups, or online database backups. In the "Number of Files" section 342 and the "Performance" section 344, "aggregate" information derived from the information contained in a particular report may be indicated or selected for inclusion in the report. For example, a report may contain aggregate information such as the number of total files and/or the number of bad files, and backup activity performance in terms of total running time and total data throughput in terms of gigabytes per hour (GB/H). The example of FIG. 10 shows that for the selected report format "Most Recent Backups," all backup types are selected and no aggregate information options, such as file or performance options, are selected.

Figure 11:
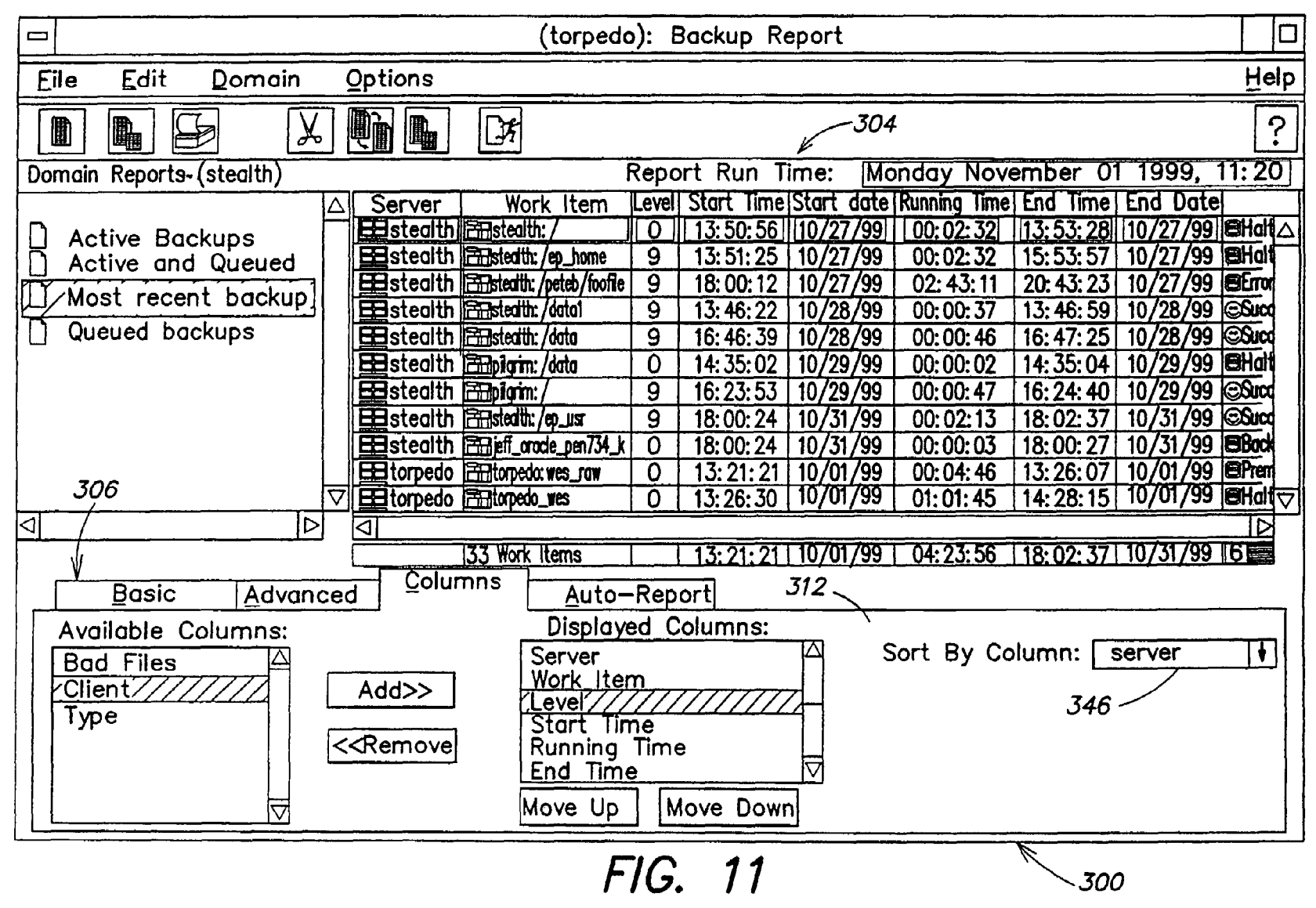

FIG. 11 is yet another graphical representation of the management window 300 in which the "Column" panel 312 is displayed in the report filter section 306. The "Column" panel 312 indicates the available columns and the displayed columns in the report output section 304. As shown in FIG. 11, the information parameters related to backup activities available for display in the report output section 304 include "Server," "Work Item," "Level," "Start Time," "Running Time," "End Time," "State (status)," "Bad Files," "Client," and "Type." For the selected report format "Most Recent Backup," the example of FIG. 11 shows that the parameters "Bad Files," "Client," and "Type" are not included (displayed) in the report output section 304. The "Column" panel 312 of the report filter section 306 also allows the selection of the ordering of rows in the report output section 304 by selecting a sorting column 346 by which the rows are ordered. As shown in the example of FIG. 11, the sorting column 346 is indicated as the "Server" column for the selected report format "Most Recent Backup."

Figure 12:
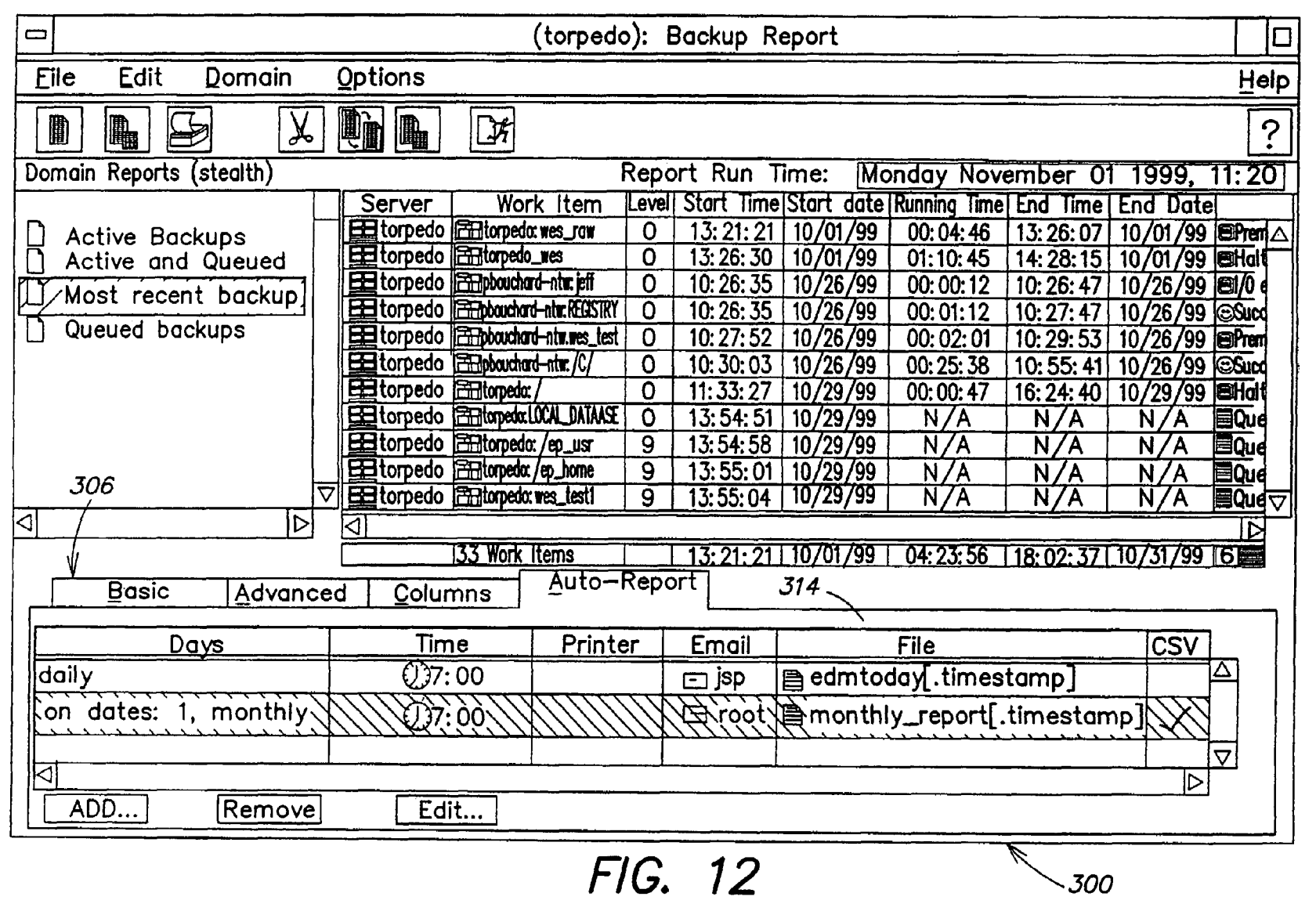

FIG. 12 is a graphical representation showing the management window 300 in which the "Auto-Report" panel 314 is selected and displayed in the report filter section 306. According to one embodiment of the invention discussed above, a domain administrator may create and save report formats from which reports are automatically and/or periodically generated and distributed to particular destinations, such as one or more printers and/or one or more E-mail recipients. The domain administrator may "tag" a particular report format for automatic and/or periodic generation and distribution from any user interface in the domain, for example, via the "Auto-Report" panel 314 shown in FIG. 12.

In the example of FIG. 12, the "Auto-Report" panel 312 indicates that a report generated using the selected report format "Most Recent Backup" will be sent daily at 7:00 to the E-mail recipient "jsp" as the file "edmtoday" with a time stamp extension. Similarly, a report using the selected report format "Most Recent Backup" will be sent on the first day of every month at 7:00 to the E-mail recipient "root" as the file "monthly_report" with a time stamp extension. While not shown in the example of FIG. 12, automatic and/or periodic reports may additionally be sent to a printer specified in the "Printer" column of the "Auto-Report" panel 314.

FIG. 13 is a graphical representation of a management window 402 that may be displayed on the user interface in response to the "Add . . . " or "Edit . . . " options being selected on the "Auto-Report" panel 314 shown in FIG. 12, according to one embodiment of the invention. As illustrated in FIG. 13, the management window 402 allows for the selection of daily, weekly, or monthly reports, and the selection of the day of the month for a report to be generated. The management window 402 also allows for the selection of the time at which the report is to be generated and a printer and E-mail destination for the report, as well as the name of a file associated with the report and the format of the report (e.g., arranged in columns or as values separated by commas).

Figure 14:
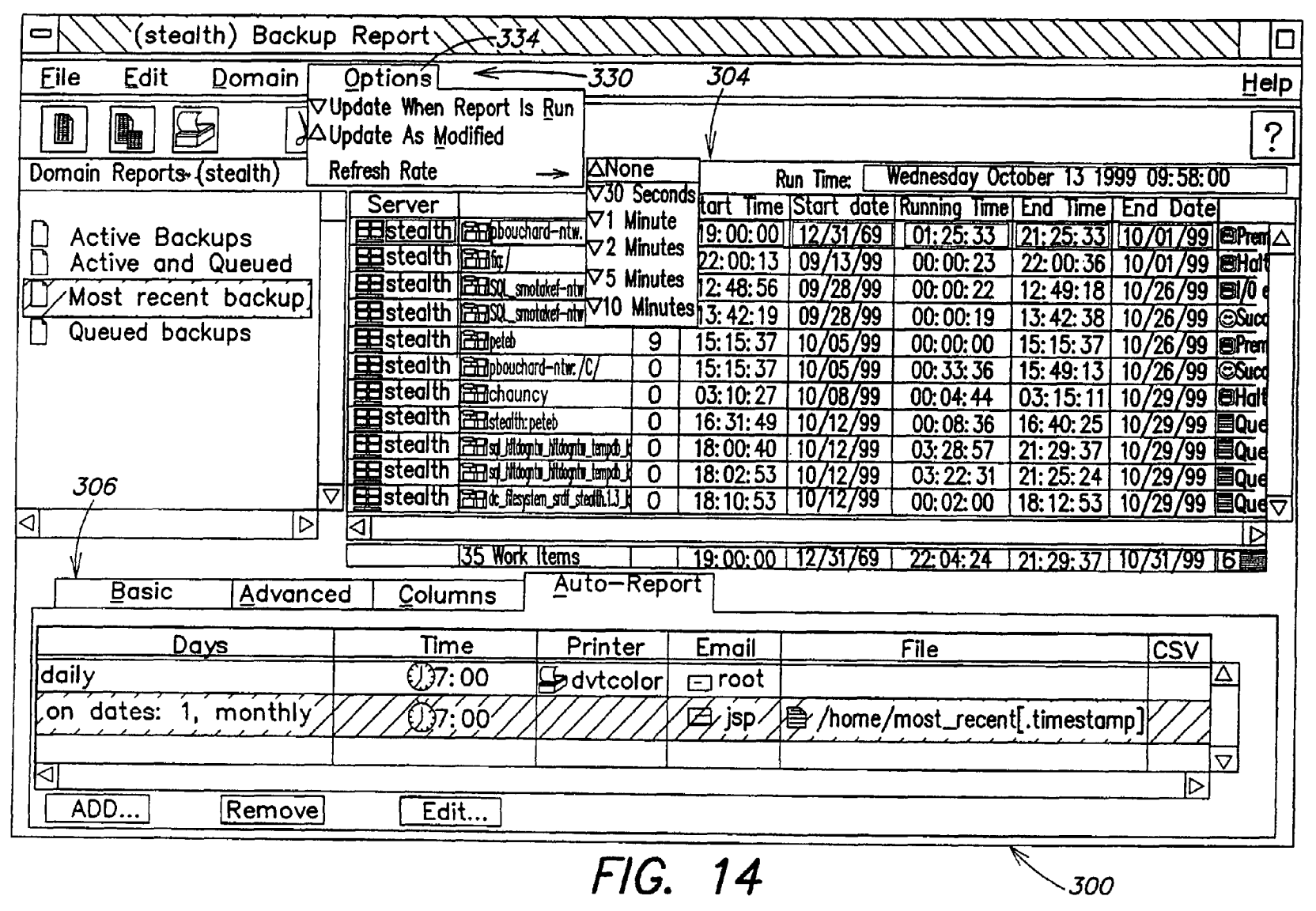

FIG. 14 is a graphical representation of the management window 300 showing the options pull down menu 334 selected from the menu bar 330. According to another embodiment of the invention discussed above, report parameters may be updated periodically in the report output section 304 so that the report output section 304 serves as a "real time monitoring window" for backup activities of one or more domain participants. In the options pull down menu 334 shown in FIG. 14, the manner of updating the report output section 304 of the management window 300 may be selected. For example, the option pull down menu 334 provides for updating when the report is run, updating as the report is modified using the report filter section 306, or updating according to an automatic refresh rate, which in the example shown in FIG. 14 may range from 30 seconds to 10 minutes. By virtue of automatic updating of the report output section 304 at the selected refresh rate, active or queued work items may be continuously or periodically monitored by a user for completion and state (success, failure). As discussed above in connection with the method of FIG. 6, information is periodically requested at the selected refresh rate from domain participants indicated in the selected report format, and subsequently filled in to the report output section 304.

It should be appreciated that the graphical representations illustrated in FIGS. 8-14 are merely examples of various management windows associated with one possible implementation of a graphical user interface according to one embodiment of the invention. In particular, a user interface according to other embodiments of the invention may involve other management window layouts or manners of representing information, may be textual rather than graphically based, and may employ a variety of devices to enable one or more users to access information related to storage activities of one or more data storage systems and otherwise interact with one or more data storage systems.

As discussed above, while examples of various aspects of the present invention have been illustrated in the context of backup data storage systems, and a particular example of an EDM backup storage system including a multiple-system GUI is illustrated in one embodiment, it should be appreciated that the present invention is not limited to the specific implementations discussed herein. Rather, the aspects of the present invention can be used to manage information relating to one or more different types of computer system resources, such that the present invention is not limited to use in managing backup storage systems.

Additionally, as discussed above, the various controllers (e.g., controllers 30, 32A, 32B, 32C) that perform a variety of functions as discussed above can be implemented in numerous ways, such as with dedicated hardware, or by software. Additionally, each controller shown in the figures may perform a number of functions, or alternatively each controller shown in the figures may be considered as representing a number of controllers each performing a dedicated function. In particular, as discussed above in connection with UNIX operating environments for computer systems, one or more of the controllers in various embodiments of the invention may be implemented via a processor that is programmed using microcode or software to perform the functions recited above.

In this respect, it should be appreciated that one implementation of the present invention comprises a computer readable medium (e.g., a computer memory, a floppy disk, a compact disk, a tape, etc.) encoded with a computer program that, when executed on a processor, performs the above discussed functions of the present invention. The computer readable medium can be transportable such that the program stored thereon can be loaded onto a computer system (one or more host computer systems or general purpose processors associated with the backup storage systems) to implement the aspects of the present invention discussed above. In addition, it should be appreciated that the reference to a computer program that, when executed, performs the above discussed functions is not limited to an application program running in an application space on the host computer. Rather, the term "computer program" is used herein in a generic sense to reference any type of computer code (e.g., software or microcode) that can be employed to program a processor to implement the above discussed aspects of the present invention.

Having described several embodiments of the invention in detail, various modifications and improvements will readily occur to those skilled in the art. Such modifications and improvements are intended to be within the spirit and scope of the invention. Accordingly, the foregoing description is by way of example only and is not intended as limiting. The invention is limited only as defined by the following claims and the equivalents thereto.

What is claimed is:

1. In a computer system having a plurality of backup storage systems configured to store backup data from at least one client, a method comprising:
   providing at least one domain comprising a plurality of backup storage systems, wherein a first backup storage system of the plurality of backup storage systems is a domain master of the at least one domain;
   storing, by the first backup storage system, an identifier identifying each of the plurality of backup storage systems in the at least one domain;
   receiving, at the first backup storage system, information related to backup activities of a second backup storage system of the plurality of backup storage systems in the at least one domain; and
   displaying the information on a user interface directly coupled to only the first backup storage system.

2. The method of claim 1, further comprising an act of:
   transmitting the information related to the backup activities of the second backup storage system from the second backup storage system to the first backup storage system.

3. The method of claim 2, wherein the computer system includes:
   a third backup storage system to store backup data from at least one client, wherein
   the at least one domain excludes the third backup storage system,
   and wherein the act of receiving information includes an act of receiving, at the first backup storage system, only information related to backup activities of backup storage systems included in the at least one domain, so that the first backup storage system does not receive information related to backup activities of the third backup storage system.

4. The method of claim 3, wherein the act of transmitting the information includes an act of transmitting the information relating to the backup activities of the second backup storage system only within the at least one domain, so that the second backup storage system does not transmit the information related to the backup activities of the second backup storage system to the third backup storage system.

5. The method of claim 1, wherein the information received at the first backup storage system is transmitted from the second backup storage system.

6. The method of claim 1, wherein the information received at the first backup storage system identifies the second backup storage system as the backup storage system to which the information relates.

7. The method of claim 1 further comprising storing, by the first backup storage system, a second identifier identifying at least one user authorized to access the information related to the backup activities of the plurality of backup storage systems in the at least one domain.

8. The method of claim 7 further comprising verifying, by the first backup storage system, an authorization of a requesting user to access the information based on the second identifier.

9. A first backup storage system to store backup data from at least one first client, the first backup storage system for use in a computer system having a second backup storage system to store backup data from at least one second client, the first backup storage system comprising:
   a first controller, coupled to the second backup storage system, to receive information related to backup activities of the second backup storage system, and comprising at least information relating to at least one backup operation; and
   a user interface to display the information related to the backup activities of the second backup storage system,
   wherein the first and second backup storage systems are included in at least one domain comprising a plurality of backup storage systems, and wherein the first backup storage system is a domain master which stores an identifier identifying each of the plurality of backup storage systems in the at least one domain.

10. The first backup storage system of claim 9, wherein the computer system includes a third backup storage system and wherein the at least one domain excludes the third backup storage system; and
   wherein the first controller receives information related to the backup activities of only backup storage systems included in the at least one domain, so that the first backup storage system does not receive backup activities of the third backup storage system.

11. The first backup storage system of claim 9, wherein the first backup storage system stores a second identifier identifying at least one user authorized to access the information related to backup activities of the plurality of backup storage systems in the at least one domain.

12. The first backup storage system of claim 11 wherein the first backup storage system is configured to verify an authorization of a requesting user to access the information based on the second identifier.

13. The first backup storage system of claim 12, wherein the second backup storage system includes a second controller to transmit the information related to the backup activities of the second backup storage system only within the at least one domain.

14. The first backup storage system of claim 13, wherein the domain master authorizes the second controller to transmit the information only within the at least one domain.

15. A computer readable medium encoded with a program for execution on a computer system that includes a plurality of backup storage systems for storing backup data from at least one client, the program, when executed on the computer system, performing a method comprising:
provding at least one domain comprising a plurality of backup storage systems, wherein a first backup storage system of the plurality of backup storage systems is a domain master of the at least one domain;
storing, in the first backup storage system an identifier identifying each of the plurality of backup storage systems in the at least one domain;
transferring information related to backup activities of a second backup storage system of the plurality of backup storage systems from the second backup storage system to the first backup storage system; and
displaying the information on a user interface directly coupled to only the first backup storage system.

16. The computer readable medium of claim 15 wherein the computer system further includes a third backup storage system to store backup data from at least one client, and wherein the at least one domain excludes the third backup storage system; and
wherein the act of transferring information includes an act of receiving, at the first backup storage system, only information related to backup activities of backup storage systems included in the at least one domain, so that the first backup storage system does not receive information related to backup activities of the third backup storage system.

17. The computer readable medium of claim 16, wherein the act of transferring the information includes an act of transmitting, from the second backup storage system, the information relating to the backup activities of the second backup storage system only within the at least one domain, so that the second backup storage system does not transmit the information related to the backup activities of the second backup storage system to the third backup storage system.

18. The computer readable medium of claim 15 wherein the program, when executed on the computer, further performs:
storing, in the first backup storage system, a second identifier identifying at least one user authorized to access the information related to the backup activities of the plurality of backup storage systems in the at least one domain.

19. The computer readable medium of claim 18 wherein the program, when executed on the computer, further performs verifying, by the first backup storage system, an authorization of a requesting user to access the information based on the second identifier.

* * * * *